United States Patent
DeMartino et al.

(10) Patent No.: US 12,209,049 B2
(45) Date of Patent: Jan. 28, 2025

(54) STRESS FEATURES FOR CRACK REDIRECTION AND PROTECTION IN GLASS CONTAINERS

(71) Applicant: CORNING INCORPORATED, Corning, NY (US)

(72) Inventors: Steven Edward DeMartino, Painted Post, NY (US); William James Miller, Horseheads, NY (US); Christopher Lee Timmons, Big Flats, NY (US); David Inscho Wilcox, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 755 days.

(21) Appl. No.: 17/376,867

(22) Filed: Jul. 15, 2021

(65) Prior Publication Data

US 2022/0017412 A1 Jan. 20, 2022

Related U.S. Application Data

(60) Provisional application No. 63/053,860, filed on Jul. 20, 2020.

(51) Int. Cl.
*C03C 21/00* (2006.01)
*A61J 1/14* (2023.01)
(Continued)

(52) U.S. Cl.
CPC ........... *C03C 21/002* (2013.01); *A61J 1/1468* (2015.05); *C03B 23/04* (2013.01); *C03B 27/012* (2013.01); *C03C 23/0025* (2013.01)

(58) Field of Classification Search
None
See application file for complete search history.

(56) References Cited

U.S. PATENT DOCUMENTS

| 4,341,544 A | 7/1982 | Beall et al. |
| 9,108,875 B2 | 8/2015 | Jiao et al. |

(Continued)

FOREIGN PATENT DOCUMENTS

| DE | 3537434 A1 * | 4/1987 | |
| EP | 2816017 A1 * | 12/2014 | ............. A61J 1/065 |

(Continued)

OTHER PUBLICATIONS

"Enhancing Patient Safety through the Use of a Pharmaceutical Glass Designed To Prevent Cracked Containers", In PDA Journal of Pharmaceutical Science and Technology, vol. 71, Issue 6, 2017, pp. 511-528.

(Continued)

*Primary Examiner* — James C Yager
*Assistant Examiner* — Thomas J Kessler
(74) *Attorney, Agent, or Firm* — F. Brock Riggs

(57) ABSTRACT

A glass container comprises a glass body comprising a first region under a compressive stress extending from a surface of the glass body to a depth of compression and a second region extending from the depth of compression into a thickness of the glass body, the second region being under a tensile stress. The glass container also includes a localized compressive stress region having a localized compressive stress extending from the surface to a localized depth of compression within the body. The localized depth of compression is greater than the depth of compression of the first region. The glass container also includes a crack re-direction region extending in a predetermined propagation direction, wherein the crack re-direction region possesses a higher tensile stress than the tensile stress in the second region in a sub-region of the crack re-direction region, the sub-region extending substantially perpendicular to the predetermined propagation direction.

27 Claims, 17 Drawing Sheets

(51) Int. Cl.
    *C03B 23/04*    (2006.01)
    *C03B 27/012*    (2006.01)
    *C03C 23/00*    (2006.01)

(56) References Cited

U.S. PATENT DOCUMENTS

| | | | |
|---|---|---|---|
| 9,296,638 B2 | 3/2016 | Lezzi et al. | |
| 2010/0147028 A1 | 6/2010 | Boaz | |
| 2012/0135195 A1* | 5/2012 | Glaesemann | B23K 26/0624 |
| | | | 428/156 |
| 2014/0120279 A1* | 5/2014 | DeMartino | C03C 21/007 |
| | | | 428/428 |
| 2015/0157533 A1 | 6/2015 | Demartino et al. | |
| 2016/0067822 A1 | 3/2016 | Arai et al. | |
| 2018/0362398 A1 | 12/2018 | Demartino et al. | |
| 2019/0161383 A1* | 5/2019 | Deneka | C03B 29/025 |
| 2020/0140328 A1 | 5/2020 | Langsdorf et al. | |
| 2020/0156991 A1 | 5/2020 | Allington et al. | |
| 2020/0307165 A1 | 10/2020 | Gross et al. | |
| 2020/0391898 A1 | 12/2020 | Antipin et al. | |
| 2022/0396522 A1 | 12/2022 | Aaldenberg et al. | |

FOREIGN PATENT DOCUMENTS

| | | |
|---|---|---|
| WO | 2013/130721 A1 | 9/2013 |
| WO | 2017/210315 A1 | 12/2017 |
| WO | 2019/160436 A1 | 8/2019 |
| WO | 2020/051021 A1 | 3/2020 |

OTHER PUBLICATIONS

Gary et al., "Thermally Tempering Open End Glass Containers", Available at: https://apps.dtic.mil/docs/citations/ADA081718, 1980, 49 pages.

Voldrich et al., "Encoding and Reading of Codes on Glass Containers for Pharmaceutical and Diagnostic Products", ISPE Tampa Conference, No. 10, 2010, pp. 1770-1774.

International Search Report and Written Opinion of the International Searching Authority; PCT/US2021/041207; dated Oct. 25, 2021; 16 pages; European Patent Office.

* cited by examiner

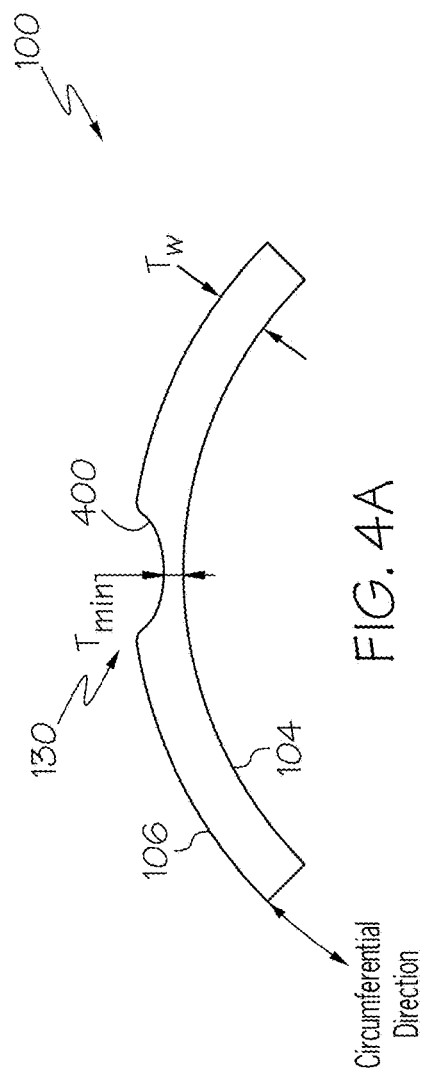
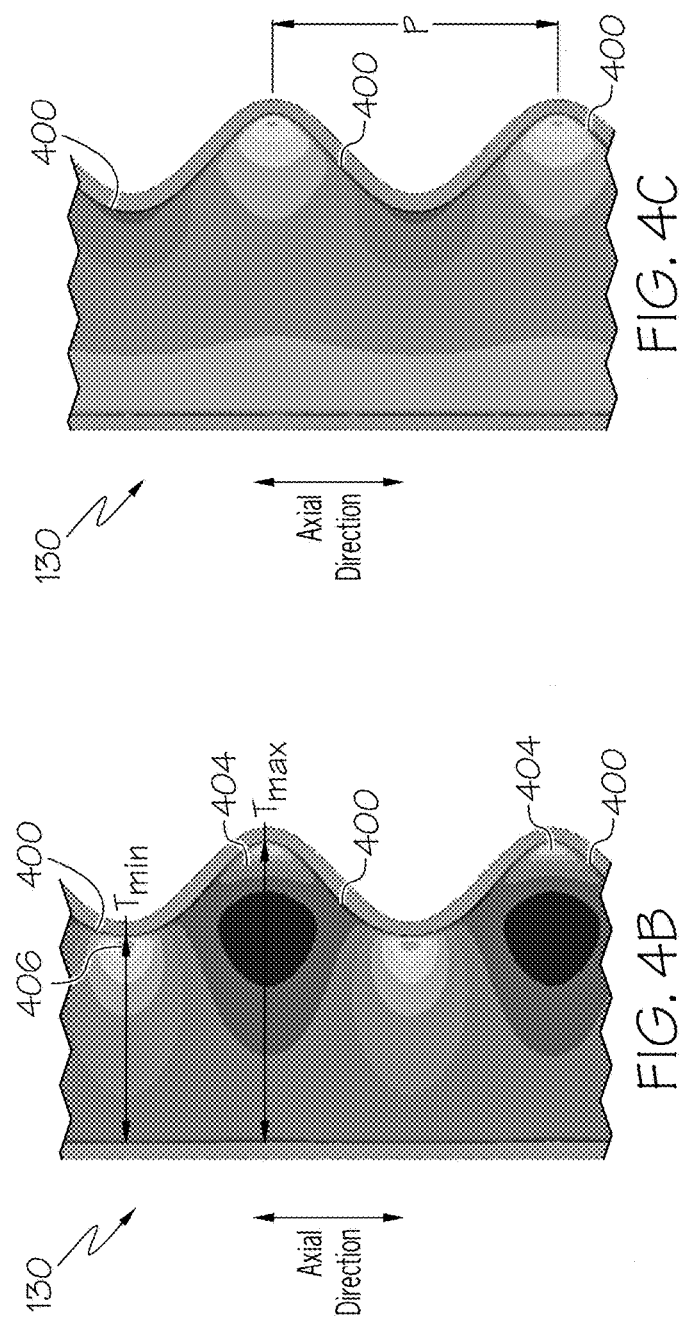

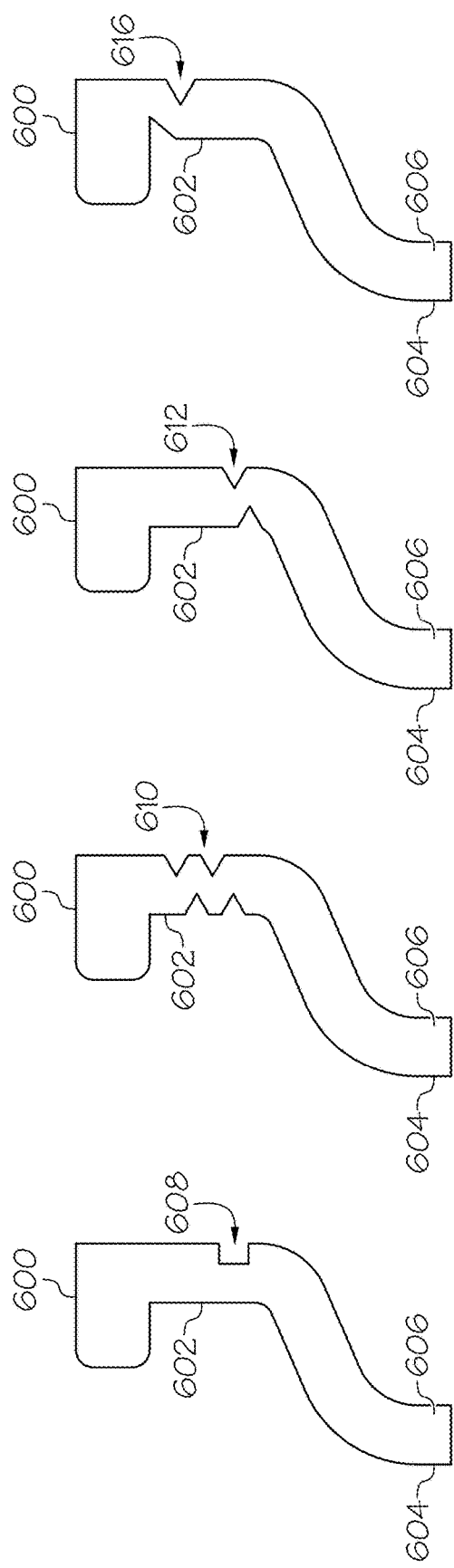
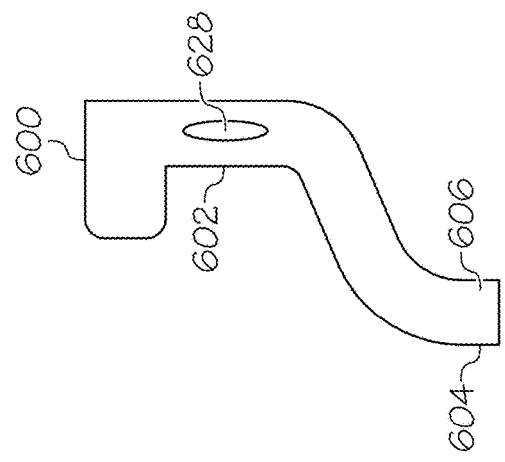
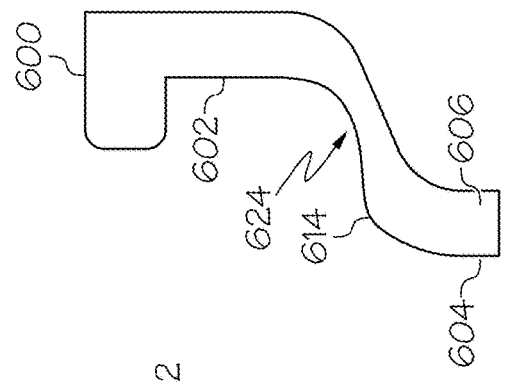
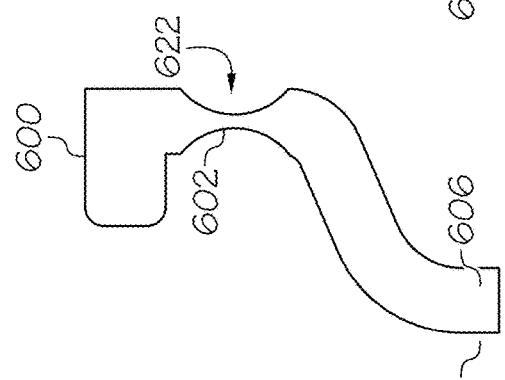
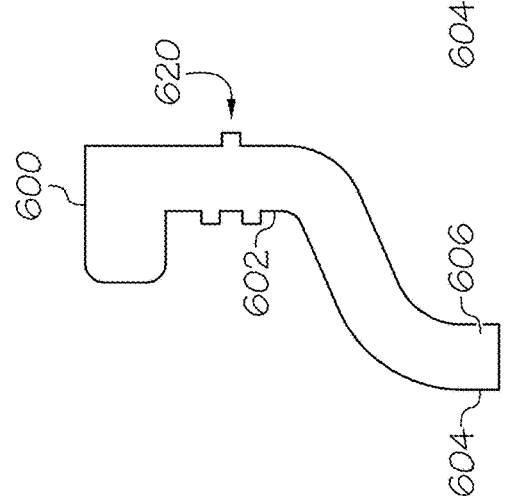

STRESS FEATURES FOR CRACK REDIRECTION AND PROTECTION IN GLASS CONTAINERS

CROSS-REFERENCE TO RELATED APPLICATIONS

This application claims the benefit of priority under 35 U.S.C. § 119 of U.S. Provisional Application Ser. No. 63/053,860 filed on Jul. 20, 2020, the content of which is relied upon and incorporated herein by reference in its entirety.

BACKGROUND

Field

The present specification generally relates to glass containers, such as glass containers for storing pharmaceutical compositions.

Technical Background

A concern for food and drug manufacturers is maintaining the sterility of package contents from failing during transport and storage until use. While glass containers are superior to many alternative materials, they are not unbreakable and occasionally experience damage from handling and transport. Cracks that extend through the wall thickness may form, compromising content sterility but not leading to catastrophic failure of the package. Additional features of glass containers, such as adhesive labels, may render such cracks less noticeable to users and thus remain in use despite the compromised sterility.

SUMMARY

A first aspect of the present disclosure includes a method of making a glass container having a first surface and a second surface separated by a thickness, the method comprises forming a first region under a compressive stress on the first surface of the glass container, wherein the first region extends from the first surface to a depth of compression in the glass container; forming a second region under a central tension, the second region extending from the depth of compression into the thickness, wherein the central tension is sufficient for self-propagation of a crack at the first surface from an origination point of the crack; forming a crack re-direction region in the first surface, wherein the crack re-direction region extends in a predetermined propagation direction for the crack and comprises a higher central tension than a remainder of the glass article in a direction substantially perpendicular to the predetermined propagation direction such that, upon the crack propagating and reaching the crack re-direction region, the crack is redirected along the predetermined propagation direction.

A second aspect of the present disclosure may include the first aspect, wherein the glass container comprises a body having an interior surface and an exterior surface, the interior surface defining an interior volume having an axis, wherein the predetermined propagation direction is substantially perpendicular to the axis.

A third aspect of the present disclosure may include the first aspect or the second aspect, wherein the thickness of the glass container varies within the crack re-direction region such that the crack re-direction region comprises a thin region extending substantially parallel to the axis where the thickness is less than an average thickness of the glass container within the crack re-direction region.

A fourth aspect of the present disclosure may include any of the first through third aspects, wherein the crack-redirection direction region extends around at least a portion of an outer circumference of the glass container.

A fifth aspect of the present disclosure may include any of the first through fourth aspects, wherein the thickness of the glass article in the crack re-direction region varies sinusoidally parallel to the axis.

A sixth aspect of the present disclosure may include any of the first through fifth aspects, wherein the crack re-direction region extends around an entirety of the outer circumference of the glass container.

A seventh aspect of the present disclosure may include any of the first through sixth aspects, wherein the first surface is the exterior surface of the glass container.

An eighth aspect of the present disclosure may include any of the first through seventh aspects, wherein the first surface is the interior of the glass container.

A ninth aspect of the present disclosure may include any of the first through eighth aspects, wherein forming the first and second regions comprises forming the glass container from a glass composition; and forming the first region and the second region by subjecting the first surface of the glass container to chemical tempering.

A tenth aspect of the present disclosure may include any of the first through ninth aspects, wherein the glass composition comprises an aluminosilicate glass composition.

An eleventh aspect of the present disclosure may include any of the first through tenth aspects, wherein forming the glass article from the glass composition comprises: forming a glass tube comprising the glass composition; and converting the glass tube into the glass container, wherein forming the crack re-direction region occurs during the conversion of the glass tube into the glass container.

A twelfth aspect of the present disclosure may include any of the first through eleventh aspects, wherein forming the crack re-direction region comprises scanning a pulsed laser beam in a predetermined pattern while the glass tube is heated to a softening temperature of the glass composition during the converting of the glass tube into the glass container.

A thirteenth aspect of the present disclosure may include a method forming a glass container having a crack re-direction region, the method comprising: providing a stock material formed from a glass composition; shaping the stock material into a glass article having a body extending between an interior surface and an exterior surface defining an interior volume; forming a compressively stressed layer in the glass article, the compressively stressed layer extending from at least one of the interior surface and the exterior surface to a depth of compression in a thickness of the body; and forming the crack re-direction region within the glass article, wherein the crack re-direction region comprises a sub-region having a higher central tension than a remainder of the glass article, wherein the sub-region extends in a direction substantially perpendicular to a predetermined propagation direction.

A fourteenth aspect of the present disclosure may include the thirteenth aspect, wherein: the stock material comprises glass tubing; the method further comprises converting the glass tubing into the glass article; forming the crack re-direction region comprises forming the sub-region of the crack re-direction region during the conversion of the glass tubing into the glass article; and the thickness of the sub-region is less than an average thickness of the body.

A fifteenth aspect of the present disclosure may include any of the thirteenth through fourteenth aspects, wherein forming the sub-region comprises scanning a pulsed laser beam in a predetermined pattern on the glass article.

A sixteenth aspect of the present disclosure may include any of the thirteenth through fifteenth aspects, wherein forming the sub-region comprises contacting the glass tubing during the conversion of the glass tubing into the glass article with a shaping element.

A seventeenth aspect of the present disclosure may include a glass container comprising: a glass body comprising a first region under a compressive stress extending from a surface of the glass body to a depth of compression and a second region extending from the depth of compression into a thickness of the glass body, the second region under a tensile stress sufficient for self-propagation of a crack from an origination point of the crack in a propagation direction; and a crack re-direction region on the surface of the glass body, the crack re-direction region extending in a predetermined propagation direction for the crack. The crack re-direction region comprises a greater tensile stress than the tensile stress in the second region in a sub-region of the crack re-direction region. The sub-region extends substantially perpendicular to the predetermined propagation direction such that, upon the crack propagating into the crack re-direction region, the crack is redirected along the predetermined propagation direction.

An eighteenth aspect of the present disclosure may include the seventeenth aspect, wherein the glass container comprises one of a bottle, vial, ampoule, syringe, or cartridge.

A nineteenth aspect of the present disclosure may include any of the seventeenth through eighteenth aspects, wherein the predetermined propagation direction is a circumferential direction substantially perpendicular to an axis of the glass container.

A twentieth aspect of the present disclosure may include any of the seventeenth through nineteenth aspects, wherein the thickness varies within the crack re-direction region such that the sub-region of the crack re-direction region comprises a thin region extending substantially parallel to the axis where the thickness is less than an average thickness of the glass article.

A twenty first aspect of the present disclosure includes a glass container comprising: a body comprising a glass composition, the body having an interior surface, an exterior surface, and a wall thickness extending between the interior surface and the exterior surface, wherein the body comprises a localized compressive stress region having a localized compressive stress extending from the exterior surface to a localized depth of compression within the body, wherein: the localized compressive stress region extends farther into the body than any regions of compressive stress adjacent to the localized compressive region.

A twenty second aspect of the present disclosure may include the twenty first aspect, wherein the glass container comprises a pharmaceutical container.

A twenty third aspect of the present disclosure may include any of the twenty first through the twenty second aspects, wherein the localized depth of compression extends greater than or equal to 2% of the wall thickness and less than or equal to 25% of the wall thickness.

A twenty fourth aspect of the present disclosure may include any of the twenty first through the twenty third aspects, wherein the localized depth of compression extends greater than or equal to 20% of the wall thickness and less than or equal to 25% of the wall thickness.

A twenty fifth aspect of the present disclosure may include any of the twenty first through the twenty fourth aspects, wherein the localized compressive stress region comprises a compressive stress of greater than or equal to 50 MPa.

A twenty sixth aspect of the present disclosure may include any of the twenty first through the twenty fifth aspects, wherein the localized compressive stress region comprises a surface compressive stress of greater than or equal to 75 MPa.

A twenty seventh aspect of the present disclosure may include any of the twenty first through the twenty sixth aspects, wherein the surface compressive stress is greater than or equal to 100 MPa.

A twenty eighth aspect of the present disclosure may include any of the twenty first through the twenty seventh aspects, wherein the localized compressive stress region overlaps with a compressively stressed layer of the glass container under a compressive stress such that, within the localized compressive stress region, the body comprises the compressive stress of the compressively stressed layer to the first depth of compression and the localized depth of stress from the first depth of compression to the localized depth of compression.

A twenty ninth aspect of the present disclosure may include any of the twenty first through the twenty eighth aspects, wherein the glass composition comprises an aluminosilicate glass composition.

A thirtieth aspect of the present disclosure may include any of the twenty first through the twenty ninth aspects, wherein the glass container comprises a vial having a base, a barrel connected to the base via a heel, a shoulder extending from the barrel, and a neck extending from the shoulder, wherein the localized compressive stress region is disposed in at least one of the neck, the heel, and the barrel.

A thirty first aspect of the present disclosure may include any of the twenty first through the thirtieth aspects, wherein the localized compressive stress region is disposed in the heel.

A thirty second aspect of the present disclosure may include any of the twenty first through the twenty thirty first aspects, further comprising an additional localized compressive stress region having an additional localized compressive stress extending from the interior surface to an additional localized depth of compression within the body.

A thirty third aspect of the present disclosure may include any of the twenty first through the thirty second aspects, wherein the localized compressive stress region and the additional localized compressive stress region oppose one another to form a region of central tension between the localized compression stress region and the additional localized compressive stress region, wherein the region of central tension facilitates branching of a crack propagating through the wall thickness to render the glass container unusable.

A thirty fourth aspect of the present disclosure includes a glass container comprising: a glass body comprising a first region under a compressive stress extending from a surface of the glass body to a depth of compression and a second region extending from the depth of compression into a thickness of the glass body, the second region being under a tensile stress; and a localized compressive stress region having a localized compressive stress extending from the surface to a localized depth of compression within the body, wherein: the localized depth of compression is greater than or equal to 2% of the wall thickness of the body and less than or equal to 25% of the wall thickness of the body, and the localized depth of compression is greater than the depth of compression of the first region.

A thirty fifth aspect of the present disclosure may include the thirty fourth aspect, wherein the localized compressive stress region overlaps with the first region such that, within the localized compressive stress region, the glass body possesses the compressive stress of the first region to the first depth of compression and the localized depth of stress from the first depth of compression to the localized depth of compression.

A thirty sixth aspect of the present disclosure may include any of the thirty fourth through the thirty fifth aspects, wherein the localized compressive stress region comprises a compressive stress of greater than or equal to 50 MPa.

A thirty seventh aspect of the present disclosure may include any of the thirty fourth through the thirty sixth aspects, wherein the surface of the glass body is an exterior surface of the glass container.

A thirty eighth aspect of the present disclosure may include a method forming a glass container having a localized compressive stress region, the method comprising: providing a stock material formed from a glass composition; shaping the stock material into a glass article having a body with a thickness extending between an interior surface and an exterior surface, the body defining an interior volume; forming a localized compressive stress region in the glass article, the localized compressive stress region having a localized compressive stress extending from the exterior surface or the interior surface to a localized depth of compression within the body, wherein the localized depth of compression is greater than or equal to 2% of the thickness and less than or equal to 25% of the thickness, wherein forming the localized compressive stress region comprises locally applying a coolant to a portion of the glass article when the glass article is heated to a starting temperature above a softening temperature of the glass composition such that the localized compressive stress region extends farther into the body than any regions of compressive stress adjacent to the localized compressive region.

A thirty ninth aspect of the present disclosure may include the thirty eighth aspect, further comprising subjecting the glass article to ion-exchange strengthening after forming the localized compressive stress region to form a first region on the exterior surface under a compressive stress, the first region extending from the exterior surface to a depth of compression that is less than the localized depth of compression.

A fortieth aspect of the present disclosure may in include any of the thirty eighth aspects through the thirty ninth aspects, wherein locally applying the coolant to the portion of the glass article induces a transient tensile stress in a central portion of the thickness that induces propagation of any cracks formed in the central portion.

A forty first aspect of the present disclosure may in include any of the thirty eighth aspects through the fortieth aspects, further comprising flame washing an entirety of the exterior surface prior to forming the localized compressive stress region to eliminate conversion flaws induced by the shaping of the stock material into the glass article.

A forty second of the present disclosure may in include any of the thirty eighth aspects through the forty first aspects, wherein locally applying the coolant to the portion of the glass article comprises: positioning a collar proximate to the portion of the glass article when the glass article is heated to the starting temperature, the collar including at least one feed for the coolant, wherein the collar is shaped in a manner that corresponds to the portion of the glass article, wherein the collar comprises contact points that contact the portion of the glass article to control a gap between a fluid manifold of the collar and the portion of the glass article; and providing the coolant to the portion of the glass article to form the localized compressive stress region.

A forty third aspect of the present disclosure may in include any of the thirty eighth aspects through the forty second aspects, wherein the glass article is not subjected to annealing heat treatments after the formation of the localized compressive stress region.

A forty fourth aspect of the present disclosure may in include any of the thirty eighth aspects through the forty third aspects, wherein the glass container comprises a vial having a base, a barrel connected to the base via a heel, a shoulder extending from the barrel, and a neck extending from the shoulder, wherein the portion of the glass article to which the coolant is applied comprises at least one of the neck and the heel A forty fifth aspect of the present disclosure may include a glass container comprising: a glass body comprising a first region under a compressive stress extending from a surface of the glass body to a depth of compression and a second region extending from the depth of compression into a thickness of the glass body, the second region being under a tensile stress; a localized compressive stress region having a localized compressive stress extending from the surface to a localized depth of compression within the body, wherein: the localized depth of compression is greater than the depth of compression of the first region; and a crack re-direction region in the glass body, the crack re-direction region extending in a predetermined propagation direction, wherein the crack re-direction region possesses a higher tensile stress than the tensile stress in the second region in a sub-region of the crack re-direction region, the sub-region extending substantially perpendicular to the predetermined propagation direction.

A forty sixth aspect of the present disclosure may in include any of the forty fifth aspect, wherein the sub-region of the crack re-direction region comprises a variation in thickness at the surface of the glass body.

A forty seventh aspect of the present disclosure may include any of the forty fifth through the forty sixth aspects, wherein the surface of the glass body comprises an exterior surface of the glass container.

A forty eighth aspect of the present disclosure may include any of the forty fifth through the forty seventh aspects, wherein the crack re-direction region overlaps with the localized compressive stress region in an overlap region.

A forty ninth aspect of the present disclosure may include any of the forty fifth through the forty eighth aspects, wherein the localized compressive stress region overlaps with the first region such that, within the localized compressive stress region, the glass body possesses the compressive stress of the first region to the first depth of compression and the localized depth of stress from the first depth of compression to the localized depth of compression.

A fiftieth aspect of the present disclosure may include any of the forty fifth through the forty ninth aspects, wherein the localized compressive stress region comprises a compressive stress of greater than or equal to 50 MPa.

A fifty first aspect of the present disclosure may include any of the forty fifth through the fiftieth aspects, wherein the glass body is formed from an aluminosilicate glass composition.

A fifty second aspect of the present disclosure may include any of the forty fifth through the fifty first aspects, wherein the glass container comprises a vial having a base, a barrel connected to the base via a heel, a shoulder extending from the barrel, and a neck extending from the shoulder.

A fifty third aspect of the present disclosure may include any of the forty fifth through the fifty first aspects, wherein the crack re-direction region is disposed in the barrel proximate to at least one of the heel and the shoulder.

A fifty fourth aspect of the present disclosure may include any of the forty fifth through the fifty third aspects, wherein the localized compressive stress region is disposed in at least one of the neck and the heel.

A fifty fifth aspect of the present disclosure may include a method forming a glass container, the method comprising: providing a stock material formed from a glass composition; shaping the stock material into a glass article having a body extending between an interior surface and an exterior surface, the body defining an interior volume; forming the crack re-direction region within the glass article, wherein the crack re-direction region comprises a sub-region having a higher central tension than a remainder of the glass article, wherein the sub-region extends in a direction substantially perpendicular to a predetermined propagation direction; and forming a localized compressive stress region in the glass article, the localized compressive stress region having a localized compressive stress extending from the interior surface or the exterior surface to a localized depth of compression within the body, wherein the localized depth of compression is greater than or equal to 2% of a thickness of the body and less than or equal 25% of the thickness of the body, wherein forming the localized compressive stress region comprises locally applying a coolant to a portion of the glass article when the glass article is heated to a starting temperature above a softening temperature of the glass composition.

A fifty sixth aspect of the present disclosure may include the fifty fifth aspect, further comprising forming a compressively stressed layer in the glass article, the compressively stressed layer extending from at least one of the interior surface and the exterior surface to a depth of compression into a thickness of the body.

A fifty seventh aspect of the present disclosure may include any of the fifty fifth through the fifty sixth aspects, wherein forming the compressively stressed layer comprises subjecting the glass article to ion-exchange strengthening after forming the localized compressive stress region to form a first region on the exterior surface under a compressive stress, the first region extending from the exterior surface to the depth of compression, wherein the depth of compression is less than the localized depth of compression.

A fifty eighth aspect of the present disclosure may include any of the fifty fifth through the fifty seventh aspects, wherein the localized compressive stress region overlaps with the first region on the external surface.

A fifty ninth aspect of the present disclosure may include any of the fifty fifth through the fifty eighth aspects, wherein the crack re-direction region overlaps with the localized compressive stress region on the external surface.

A sixtieth aspect of the present disclosure may include any of the fifty fifth through the fifty ninth aspects, further comprising flame washing an entirety of the exterior surface prior to forming the localized compressive stress region to eliminate conversion flaws induced by the shaping of the stock material into the glass article.

A sixth first aspect of the present disclosure may include any of the fifty fifth through the sixtieth aspects, wherein locally applying the coolant to the portion of the glass article comprises: positioning a collar proximate to the portion of the glass article when the glass article is heated to the starting temperature, the collar including at least one feed for the coolant, wherein the collar is shaped in a manner that corresponds to the portion of the glass article; and providing the coolant to the portion of the glass article to form the localized compressive stress region.

A sixty second aspect of the present disclosure may include any of the fifty fifth through the sixty first aspects, wherein the collar comprises contact points that contact the portion of the glass article to control a gap between a fluid manifold of the collar and the portion of the glass article.

A sixty third aspect of the present disclosure may include any of the fifty fifth through the sixty second aspects, wherein the glass container comprises a vial having a base, a barrel connected to the base via a heel, a shoulder extending from the barrel, and a neck extending from the shoulder, wherein the portion of the glass article to which the coolant is applied comprises at least one of the neck and the heel A sixty fourth aspect of the present disclosure may include any of the fifty fifth through the sixty third aspects, wherein forming the crack re-direction region comprises forming the sub-region of the crack re-direction region during the shaping of the stock material into the glass article, wherein a thickness of the sub-region is less than an average thickness of the body.

A sixty fifth aspect of the present disclosure may include any of the fifty fifth through the sixty fourth aspects, wherein forming the sub-region comprises scanning a pulsed laser beam in a predetermined pattern on the glass article.

A sixty sixth aspect of the present disclosure may include any of the fifty fifth through the sixty fifth aspects, wherein forming the sub-region comprises contacting the stock material during the shaping of the stock material into the glass article with a shaping element having a shape corresponding to a predetermined shape of the sub-region.

A sixty seventh aspect of the present disclosure may include any of the fifty fifth through the sixty sixth aspects, wherein a thickness of a portion of the crack re-direction region is greater than an average thickness of the body.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A schematically depicts a cross section of the crack re-direction region of FIG. 1, according to one or more embodiments described herein;

FIG. 4B schematically depicts a cross section of the crack re-direction region of FIG. 1, according to one or more embodiments described herein;

FIG. 4C schematically depicts a cross section of the crack re-direction region of FIG. 1, according to one or more embodiments described herein;

FIG. 6A schematically depicts a glass container including a crack re-direction region, according to one or more embodiments described herein;

FIG. 6B schematically depicts the glass container of FIG. 6A including another crack re-direction region, according to one or more embodiments described herein;

FIG. 6C schematically depicts the glass container of FIG. 6A including another crack re-direction region, according to one or more embodiments described herein;

FIG. 6D schematically depicts the glass container of FIG. 6A including another crack re-direction region, according to one or more embodiments described herein;

FIG. 6E schematically depicts the glass container of FIG. 6A including another crack re-direction region, according to one or more embodiments described herein;

FIG. 6F schematically depicts the glass container of FIG. 6A including another crack re-direction region, according to one or more embodiments described herein;

FIG. 6G schematically depicts the glass container of FIG. 6A including another crack re-direction region, according to one or more embodiments described herein;

FIG. 6H schematically depicts the glass container of FIG. 6A including another crack re-direction region, according to one or more embodiments described herein;

DETAILED DESCRIPTION

Figure 1:
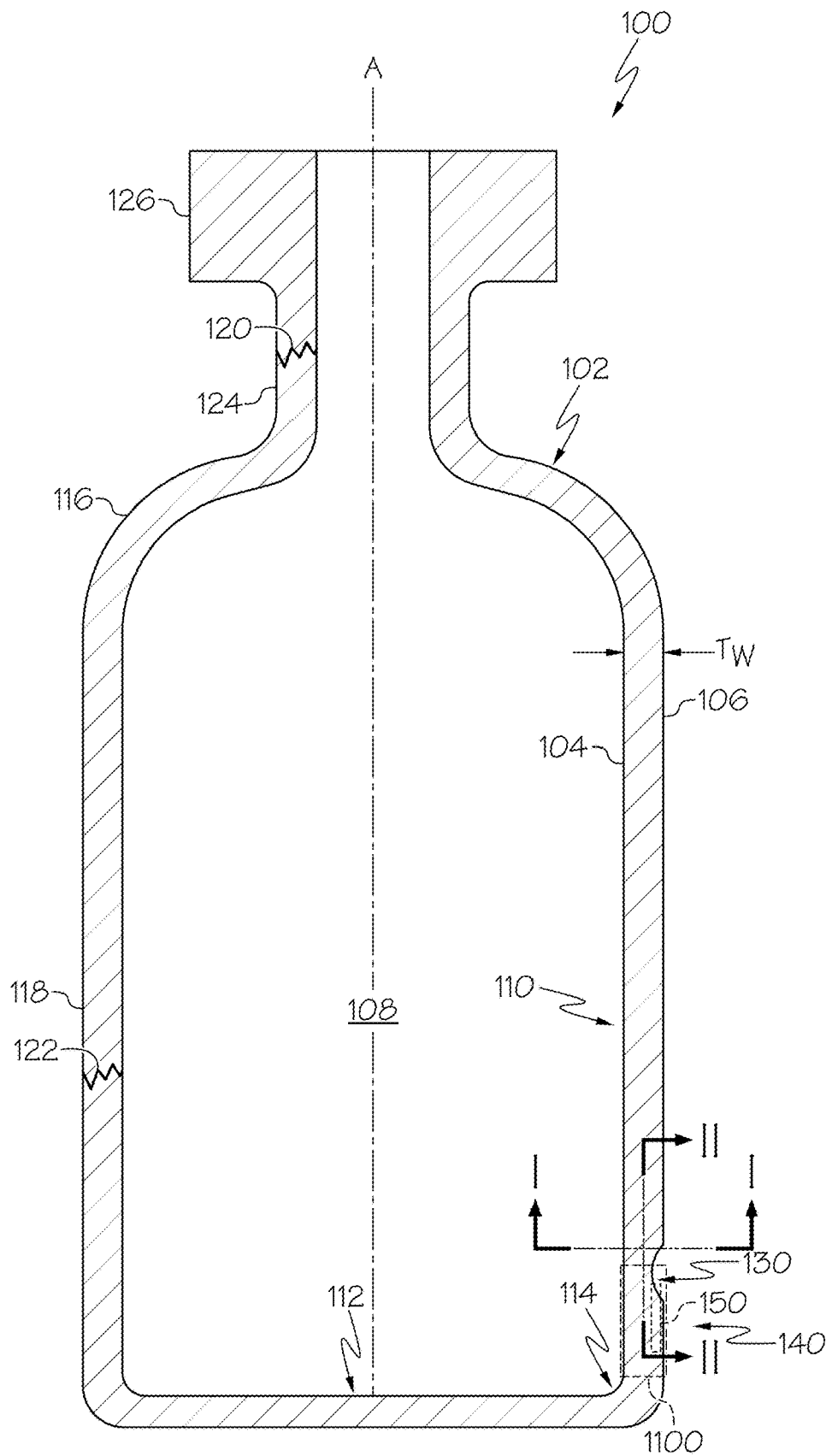
FIG. 1 schematically depicts a cross section of a glass container including a crack re-direction region and a localized compressive stress region, according to one or more embodiments described herein.

Reference will now be made in detail to embodiments of glass containers having features that prevent cracks from originating in and propagating through glass containers in a manner that can compromise the sterility of the items (e.g., pharmaceuticals) disposed therein. For example, the features of the glass containers described herein may prevent initial surface flaws from forming or propagating through the glass container in an unnoticeable or unobservable manner so as to prevent the item disposed in the glass container from being unnoticeably compromised. Such surface flaws may be introduced to glass containers through contact with other surfaces during formation, transport, filling, and handling. Cracks under an applied tension may propagate from a point of origination. For example, a crack formed in a glass container having a residual central tension may propagate in a direction dependent on stress fields within the glass container. If the glass container has a higher circumferential stress than an axial stress, for example, a crack may propagate in the axial direction rather than a circumferential direction. Such an axial crack, if propagating through a body of a glass container having an adhesive label or other cover, may be concealed by the adhesive label and may be generally less noticeable to a handler of the glass container. Various embodiments of the present disclosure introduce central tension distributions into the glass container that promote the redirection of cracks that may originate in the glass containers to more noticeable and/or observable portions of the glass containers, or render the glass containers unusable as a result of the crack redirection. For example, a glass container may include a crack re-direction region having a central tension in an axial direction that is greater than a central tension in a circumferential direction to promote crack propagation in a desired region of the glass container (e.g., a portion of the glass container not typically concealed by an adhesive label) in a circumferential direction.

In embodiments, the glass containers described herein may also include localized compressive stress regions that render the glass containers more durable within the localized compressive stress regions. The localized compressive stress regions may be particularly positioned in regions of the glass container that frequently contact external elements (e.g., forming apparatuses, other glass containers during transport, capping devices, etc.). Beneficially, the localized compressive stress regions described herein have a depth of compression greater than those found in conventional glass containers. Such deeper depths of compression beneficially prevent surface flaws from reaching regions of central tension that may be in a core region of the glass container, and therefore prevent the surface flaws from propagating through the glass container and compromising container integrity. In accordance with the present disclosure, such localized compressive stress regions may be formed through subjecting select regions of the glass container to localized thermal strengthening treatments. Such thermal strengthening treatments may have additional benefits, such as inducing a transient tensile stress in the glass container to aid in identify glass containers with relatively deep surface flaws resulting from the formation process of the glass containers. The localized thermal tempering may be used to identify and eliminate defective glass containers from a population of glass containers.

In embodiments, the glass containers described herein may include both a crack re-direction region and a localized compressive stress region to provide synergistic effects. For example, embodiments may include a crack re-direction region of enhanced central tension that overlaps with a local compressive stress region at an outer surface of the glass container to provide both improved damage resistance (e.g., resistance to surface flaws from reaching a region of central tension within a thickness of the glass container) and crack redirection in the region of overlap. In embodiments, the crack re-direction regions may be positioned based on the localized compressive stress regions included in the glass containers such that the crack re-direction regions re-direct cracks originating at specific locations on the glass container disposed between the crack re-direction region and the localized compressive stress region.

In the embodiments of the glass containers described herein, the concentration of constituent components (e.g., $SiO_2$, $Al_2O_3$, $B_2O_3$ and the like) of the glass composition from which the glass containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "chemical durability," as used herein, refers to the ability of the glass composition to resist degradation upon exposure to specified chemical conditions. Specifically, the chemical durability of the glass compositions described herein was assessed according to 3 established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 entitled "Glass Containers For Pharmaceutical Use" which assess the durability of the surface of the glass.

The term "softening point," as used herein, refers to the temperature at which the viscosity of the glass composition is $1 \times 10^{7.6}$ poise.

The term "CTE," as used herein, refers to the coefficient of thermal expansion of the glass composition over a temperature range from about room temperature (RT) to about 300° C.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, one embodiment of a glass container 100 for storing a pharmaceutical formulation is schematically depicted in cross section. The glass container 100 generally comprises a body 102. The body 102 extends between an inner surface 104 and an outer surface 106, includes a central axis A, and generally encloses an interior volume 108. In the embodiment of the glass container 100 shown in FIG. 1, the body 102 generally comprises a wall portion 110 and a floor portion 112. The wall portion 110 transitions into the floor portion 112 through a heel portion 114. In the depicted embodiment, the glass container 100 includes a flange 126, a neck region 124 extending from the flange 126, a barrel 118, and a shoulder region 116 extending between the neck region 124 and the barrel 118. The floor portion 112 is coupled to the barrel 118 via the heel portion 114. In embodiments, the glass container 100 is symmetrical about a central axis A, with each of the barrel 118, neck region 124, and flange 126, being substantially cylindrical-shaped. The body 102 has a wall thickness $T_W$ which extends between the inner surface 104 to the outer surface 106, as depicted in FIG. 1.

In embodiments, the glass container 100 may be formed from Type I, Type II or Type III glass as defined in USP <660>, including borosilicate glass compositions such as Type 1B borosilicate glass compositions under USP <660>. Alternatively, the glass container 100 may be formed from alkali aluminosilicate glass compositions such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 100 may be constructed from a soda lime glass composition.

While the glass container 100 is depicted in FIG. 1 as having a specific form-factor (i.e., a vial), it should be understood that the glass container 100 may have other form factors, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

The wall thickness $T_W$ of the glass container 100 may vary depending on the implementation. In embodiments, the wall thickness $T_W$ of the glass container 100 may be from less than or equal to 6 millimeters (mm), such as less than or equal to 4 mm, less than or equal to 2 mm, less than or equal to 1.5 mm or less than or equal to 1 mm. In some embodiments, the wall thickness $T_W$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_W$ may be greater than or equal to 0.9 mm and less than or equal to 1.8 mm.

Various portions of the glass container 100 may be susceptible to the formation of surface flaws or cracks during the formation, transport, and use of the glass container 100. During formation, for example, a glass tube may be subjected to a conversion process where the glass tube is shaped, cut, and strengthened to form the glass container 100. The conversion process may include various processing stations where various apparatuses (e.g., forming devices, piercing devices, etc.) may contact the inner surface 104 and the outer surface 106 potentially initiating flaws. In another example, in embodiments where the glass container 100 is a pharmaceutical container, a metallic filling apparatus may contact the neck region 124 (e.g., a rotating metal disk crimp) or heel region 114 and initiate a surface flaw 120 at the outer surface 106. In another example, during transport of the glass container 100, the outer surface 106 at the barrel 118 may contact another glass container and initiate a surface flaw 122.

Various aspects of the glass container 100 may be designed to prevent or reduce the impact of flaws such as the surface flaws 120 and 122 on the functionality of the glass container 100. For example, referring to FIG. 2, in embodiments, the body 102 includes a compressively stressed layer 202 extending from at least the outer surface 106 of the body 102 into the wall thickness $T_W$ to a depth of compression DOC from the outer surface 106 of the body 102. The compressively stressed layer 202 generally increases the strength of the glass container 100 and also improves the damage tolerance of the glass container 100. Specifically, a glass container having a compressively stressed layer 202 is generally able to withstand a greater degree of surface damage, such as scratches, chips, or the like, without failure compared to a non-strengthened glass container as the compressively stressed layer 202 mitigates the propagation of cracks from surface damage in the compressively stressed layer 202.

Several different techniques may be utilized to form the compressively stressed layer 202 in the body 102 of the glass container 100. For example, in embodiments where the body 102 is formed from ion exchangeable glass, the compressively stressed layer 202 may be formed in the body 102 by ion exchange. In these embodiments, the compressively stressed layer 202 is formed by placing the glass container in a bath of molten salt to facilitate the exchange of relatively large ions in the molten salt for relatively smaller ions in the glass. Several different exchange reactions may be utilized to achieve the compressively stressed layer 202. In one embodiment, the bath may contain molten $KNO_3$ salt while the glass from which the glass container 100 is formed contains lithium and/or sodium ions. In this embodiment, the potassium ions in the bath are exchanged for the relatively smaller lithium and/or sodium ions in the glass, thereby forming the compressively stressed layer 202. In another embodiment, the bath may contain $NaNO_3$ salt and the glass from which the glass container 100 is formed contains lithium ions. In this embodiment, the sodium ions in the bath are exchanged for the relatively smaller lithium ions in the glass, thereby forming the compressively stressed layer 202.

In one specific embodiment, the compressively stressed layer 202 may be formed by submerging the glass container in a molten salt bath of 100% $KNO_3$ or, in the alternative, a mixture of $KNO_3$ and $NaNO_3$. For example, in one embodiment the molten salt bath may include $KNO_3$ with up to about 10% $NaNO_3$. In this embodiment, the glass from which the container is formed may include sodium ions and/or lithium ions. The temperature of the molten salt bath may be greater than or equal to 350° C. and less than or equal to 500° C. In some embodiments, the temperature of the molten salt bath may be greater than or equal to 400° C. and less than or equal to 500° C. In still other embodiments, the temperature of the molten salt bath may be greater than or equal to 450° C. and less than or equal to 475° C. The glass container may be held in the molten salt bath for a time period sufficient to facilitate the exchange of the relatively large ions in the salt bath with relatively smaller ions in the glass and thereby achieve the desired surface compressive stress and depth of layer. For example, the glass may be held in the molten salt bath for a period of time which is greater than or equal to 0.05 hours to less than or equal to about 20 hours in order to achieve the desired depth of layer and surface compressive stress. In some embodiments the glass container may be held in the molten salt bath for greater than or equal to 4 hours and less than or equal to about 12 hours. In other embodiments, the glass container may be held in the molten salt bath for greater than or equal to about 5 hours and less than or equal to about 8 hours. In one embodiment, the glass container may be ion exchanged in a molten salt bath which comprises 100% $KNO_3$ at a temperature greater than or equal to about 400° C. and less than or equal to about 500° C. for a time period greater than or equal to about 5 hours and less than or equal to about 8 hours.

Typically, the ion exchange process is performed at temperatures greater than 150° C. below the strain point ($T_{strain}$) of the glass in order to minimize stress relaxation due to elevated temperatures. However, in some embodiments, the compressively stressed layer 202 is formed in a molten salt bath which is at temperature greater than the strain point of the glass. This type of ion exchange strengthening is referred to herein as "high temperature ion-exchange strengthening." In high temperature ion-exchange strengthening, relatively smaller ions in the glass are exchanged with relatively larger ions from the molten salt bath, as described herein. As the relatively smaller ions are exchanged for relatively larger ions at temperatures above the strain point, the resultant stress is released or "relaxed". However, the replacement of smaller ions in the glass with larger ions creates a surface layer in the glass which has a lower coefficient of thermal expansion (CTE) than the remainder of the glass. As the glass cools, the CTE differential between the surface of the glass and the remainder of the glass creates the compressively stressed layer 202. This high temperature ion-exchange technique is particularly well suited to strengthening glass articles, such as glass containers, which have complex geometries and typically reduces the time of the strengthening process relative to typical ion exchange processes and also enables a greater depth of layer.

Figure 3:
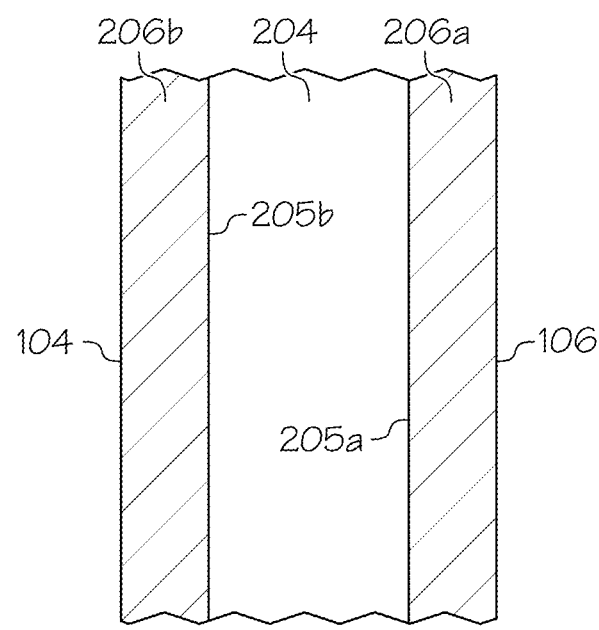
FIG. 3 schematically depicts a portion of the sidewall of the glass container formed from laminated glass.

Referring to FIG. 3, in embodiments, the glass container 100 may be formed from laminated glass which facilitates the formation of a compressively stressed layer 202 in at least the outer surface 106 of the body 102. The laminated glass generally comprises a glass core layer 204 and at least one glass cladding layer 206a. In the embodiment of the glass container 100 depicted in FIG. 3, the laminated glass includes a pair of glass cladding layers 206a, 206b. In this embodiment, the glass core layer 204 generally comprises a first surface 205a and a second surface 205b which is opposed to the first surface 205a. A first glass cladding layer 206a is fused to the first surface 205a of the glass core layer 204 and a second glass cladding layer 206b is fused to the second surface 205b of the glass core layer 204. The glass cladding layers 206a, 206b are fused to the glass core layer 204 without any additional materials, such as adhesives, coating layers or the like, disposed between the glass core layer 204 and the glass cladding layers 206a, 206b.

In the embodiment shown in FIG. 3, the glass core layer 204 is formed from a first glass composition having an average core coefficient of thermal expansion $CTE_{core}$ and the glass cladding layers 206a, 206b are formed from a second, different glass composition which has an average coefficient of thermal expansion $CTE_{clad}$. In the embodiments described herein, $CTE_{core}$ is not equal to $CTE_{clad}$ such that a compressive stress layer is present in at least one of the core layer or the cladding layer. In some embodiments, $CTE_{core}$ is greater than $CTE_{clad}$ which results in the glass cladding layers 206a, 206b being compressively stressed without being ion exchanged or thermally tempered. In such embodiments, one of the cladding layers 206a, 206b may comprise the compressively stressed layer 202 depicted in FIG. 2. In some other embodiments, such as when the laminate glass comprises a single core layer and a single cladding layer, $CTE_{clad}$ may be greater than $CTE_{core}$ which results in the glass core layer being compressively stressed without being ion exchanged or thermally tempered. The laminated glass may be formed by a fusion lamination process such as the process described in U.S. Pat. No. 10,450,214, which is incorporated herein by reference. When the laminated glass is used to form a container, these compressively stressed layers extend from the outer surface 106 of the glass container 100 into the wall thickness $T_W$ and from the inner surface 104 of the glass container into the wall thickness $T_W$.

Figure 2:
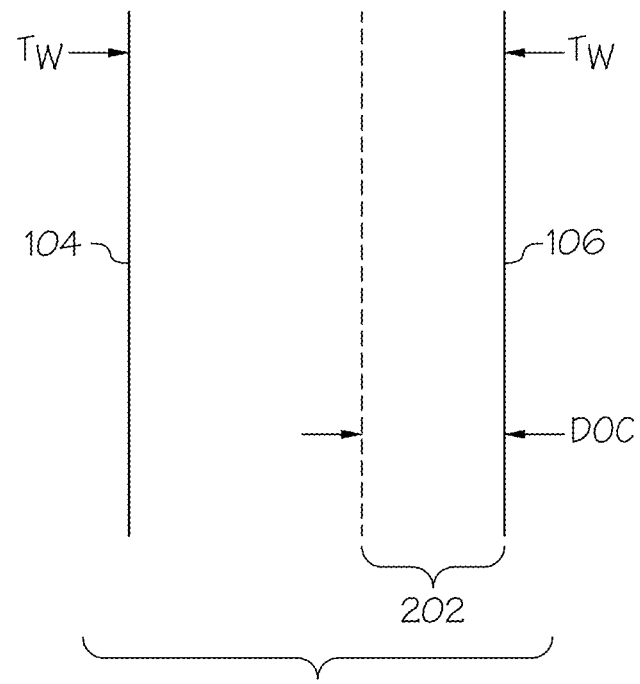
FIG. 2 schematically depicts a compressively stressed layer in a portion of the sidewall of the glass container of FIG. 1.

Referring to FIG. 2, the DOC to which the compressively stressed layer 202 extends into the wall thickness $T_W$ may depend on the methodology used to form compressively stressed layer 202. Depending on the implementation, the compressively stressed layer 202 may extend from the outer surface 106 of the body of the glass container into the wall thickness $T_W$ to a DOC which is greater than or equal to about 1 μm and less than or equal to about 90% of the wall thickness $T_W$. In embodiments where the compressively stressed layer 202 is formed as a sub-layer of laminated glass, the compressively stressed layer 202 may extend from the outer surface 106 of the body 102 of the glass container into the wall thickness $T_W$ to a DOC which is greater than or equal to about 1 μm and less than or equal to about 33% of the wall thickness $T_W$. In embodiments where the compressively stressed layer 202 is formed by subjecting the glass container 100 to an ion exchange process, the compressively stressed layer 202 may extend from the outer surface 106 of the body 102 of the glass container 100 into the wall thickness $T_W$ to a DOC which is greater than or equal to about 1 μm and less than or equal to about 10% of the wall thickness $T_W$.

In embodiments, the compressively stressed layer 202 (e.g., both the outer clad layers 206a, 206b) may be under a compressive stress of greater than or equal to 50 megapascals (MPa), greater than or equal to 75 MPa, greater than or equal to 100 MPa, or even greater than or equal to 150 MPa. For example, in embodiments, the compressively stressed layer 202 may be under a compressive stress of greater than or equal to 50 MPa and less than or equal to 700 MPa, greater than or equal to 50 MPa and less than or equal to 500 MPa, greater than or equal to 50 MPA and less than or equal to 400 MPa, greater than or equal to 75 MPa and less than or equal to 750 MPa, greater than or equal to 75 MPa and less than or equal to 500 MPa, greater than or equal to 75 MPa and less than or equal to 400 MPa, greater than or equal to 100 MPa and less than or equal to 700 MPa, greater than or equal to 100 MPa and less than or equal to 500 MPa, or even greater than or equal to 100 MPa and less than or equal to 400 MPa.

In embodiments, the remainder of the glass container 100 outside of the compressively stressed layer 202 (e.g., the core layer 204 described with respect to FIG. 3) are under a central tension that balances the compressive stress of the compressively stressed layer 202. For example, in embodiments, as a result of the CTE mismatch between the outer clad layers 206a, 206b, the core layer 204 may exhibit a central tension, or tensile stress greater than or equal to 10 MPa and less than or equal to 50 MPa, such as greater than or equal to 10 MPa and less than or equal to 40 MPa, greater than or equal to 10 MPa and less than or equal to 30 MPa, greater than or equal to 15 MPa and less than or equal to 50 MPa, greater than or equal to 15 MPa and less than or equal to 40 MPa, or greater than or equal to 15 MPa and less than or equal to 30 MPa. In embodiments (e.g., where the compressively stressed layer 202 is formed by subjecting the glass container 100 to ion exchange), the core layer 204 may exhibit a central tension of between 10-15 MPa.

Referring back to FIG. 1, where a stored central tension in the glass container 100 is above a threshold amount (e.g., 10 MPa), surface flaws 120 and 122 in the glass container 100 that extend into the central tension may form cracks that propagate from their points of origination. The direction of propagation of cracks originating from the surface flaws 120 and 122 may depend on the orientation of the residual stress fields within the glass container 100. For example, in an embodiment, the wall thickness $T_W$ is substantially constant throughout the barrel 118 (e.g., at approximately 1.5 mm), and a residual tensile stress in an axial direction (e.g., parallel to the axis A) in the barrel 118 is less than a residual tensile stress in a circumferential direction (e.g., extending perpendicular to the central axis A and to the outer surface 106 within the barrel 118). In such a case, the surface flaw 122 may propagate in a direction perpendicular to the direction having a higher residual tensile stress. In this example, the surface flaw 122 may propagate in the axial direction. The glass container 100 may possess the requisite strength to maintain its overall structure (e.g., remain intact) even if the crack resulting from the surface flaw 122 extends through the entire glass container 100 in the axial direction.

Under these circumstances, a user of the glass container 100 may not notice such a crack propagating in the axial direction. Moreover, in use, the glass container 100 may include any number of labels (e.g., adhesive labels) disposed on the outer surface 106. Such adhesive labels may conceal cracks originating from surface flaws such as the surface flaws 120 and 122. Cracks propagating through the glass container 100 may also branch into multiple cracks generally extending in a direction perpendicular to the direction of greatest residual tensile stress. Such cracks may compromise the sterility of items contained within the glass container 100. Given this, it is advantageous to prevent cracks from propagating from the surface flaws 120 and 122. Moreover, in the event that such cracks do enter the region of the glass container 100 under a tensile stress, it is beneficial to ensure that such cracks propagate in a noticeable manner so that defective glass containers 100 may be quickly identified and discarded.

In view of the foregoing, in embodiments, the glass container 100 is includes a crack re-direction region 130 and a localized compressive stress region 140. The localized compressive stress region 140 is a region of the glass container 100 under a compressive stress extending from at least one of the outer surface 106 and the inner surface 104. In the depicted embodiment, the localized compressive stress region 140 extends from the outer surface 106 into the wall thickness $T_W$ by an amount that is greater than regions of compressive stress of the glass container 100 that are adjacent to the compressive stress region 140. For example, in embodiments where the glass container includes the compressively stressed layer 202 as described with respect to FIG. 2, the localized compressive stress region 140 may be under a compressive stress to a localized depth of compression $DOC_L$ that is greater than the DOC of the compressively stressed layer. The deeper depth of compression of the compressive stress within the localized compressive stress region 140 beneficially prevents surface flaws from reaching the residual tensile stress within the glass container 100 and propagating within the glass container 100.

While the embodiment depicted in FIG. 1 includes a single localized compressive stress region 140 in the heel region 114, it should be understood that embodiments including greater numbers of localized compressive stress regions and/or localized compressive stress regions in alternative locations on the glass container 100 are envisioned (e.g., within the neck region 124, the barrel 118, the shoulder region 116, or any other location on the glass container 100).

In embodiments, the localized compressive stress region 140 is formed by applying localized thermal strengthening treatments to the glass container 100 involving heating the glass container to a specified temperature (e.g., heating to a softening point for a glass composition from which the glass container 100 is formed) followed by a rapid cooling step where at least one of the inner surface 104 and the outer surface 106 is cooled through application of a coolant thereto. Various methods of forming the localized compressive stress region 140 are described in greater detail herein.

Still referring to FIG. 1, the crack re-direction region 130 includes a modified residual stress field as compared to the remainder of the glass container 100 (e.g., those portions of the glass container outside of the crack re-direction region 130). The stress field may be modified such that the residual tensile stress within the crack re-direction region 130 is greater in a direction substantially perpendicular to a desired propagation direction for a crack. For example, in embodiments, it may be desired to redirect a crack that initially propagates in the axial direction (e.g., substantially parallel to the axis A) towards the floor portion 112 from the surface flaw 122 to instead propagate in a circumferential direction in a noticeable portion of the glass container 100 (e.g., a region of the glass container 100 not covered by an adhesive label). In such embodiments, the crack re-direction region 130 may have a residual tensile stress region having a higher tensile stress extending in the axial direction than in the circumferential direction in order to redirect the crack as desired.

The residual stress field within the crack re-direction region 130 may be directionally modified as compared to the remainder of the glass container 100 in a variety of different manners. In the embodiment depicted in FIG. 1, for example, the crack re-direction region 130 is a thin region where the wall thickness $T_W$ is reduced. Such thickness reduction may increase the central tension within the crack re-direction region 130 when the glass container is strengthened. For example, the compressively stressed layer 202 (e.g., formed through an ion exchange process) may extend through a greater portion of the wall thickness $T_W$ than in other regions of the glass container 100, causing the region of the glass container 100 outside of the compressively stressed layer 202 to have a greater central tension to balance the compressive stress. The crack re-direction region 130 may include any number of such thin regions arranged in any manner to create a desired directionality in the residual tensile stress field within the crack re-direction region 130.

The glass container 100 may include any number of crack re-direction regions having a variety of different structures. In embodiments, the crack re-direction regions are positioned to redirect cracks through portions of the glass container 100 that are typically not covered by an adhesive label or the like to increase the visibility of cracks propagating through the glass container 100 originating from relatively common points of origination. A variety of different crack re-direction regions and methods of forming the same are described in greater detail herein.

Still referring to FIG. 1, while the crack re-direction region 130 and the localized compressive stress region 140 are shown to both extend on the outer surface 106, it should be understood that, in alternative embodiments, at least one of the crack re-direction region 130 and the localized compressive stress region 140 may be located on the inner surface 104. Moreover, certain embodiments may include multiple crack re-direction regions or localized compressive stress regions. In embodiments, both the outer surface 106 and the inner surface 104 including at least one localized compressive stress region and crack re-direction region.

In embodiments, the crack re-direction region 130 may overlap with the localized compressive stress region 140. Such an arrangement may beneficially lessen the extent to which the glass container 100 is modified to form a crack re-direction region 130 that redirects cracks in a desired manner. Within the localized compressive stress region 140, in addition to having a layer under compressive stress that extends deeper into the wall thickness $T_W$, the glass container 100 may also have a region of greater central tension that overlaps the relatively deep layer of compressive stress. For example, the embodiment depicted in FIG. 1 depicts a region of overlap 150 between the localized compressive stress region 140 and the crack re-direction region 130. That is, the region of overlap 150 contains both the crack re-direction region 130 and the localized compressive stress region 140 (i.e., is subjected to the processes for forming both the crack re-direction region 130 and the compressive stress region 140 described herein). The increased central tension proximate to the region of overlap 150 resulting from the localized thermal strengthening treatments used to form the localized compressive stress region 140 may lessen the need to, for example, alter a thickness of glass container within the crack re-direction region 130 to achieve the desired modification in residual stress field. In other words, greater wall thicknesses $T_W$ may be possible within the region of overlap 150 to achieve the same crack re-direction effect, resulting in stronger glass articles than where the crack re-direction region 130 does not overlap with the localized compressive stress region 140, while providing the same crack re-direction capability.

Referring now to FIG. 4A, a cross sectional view of an embodiment of the crack re-direction region 130 at the line I-I in FIG. 1 is depicted. FIG. 4A depicts a circumferential portion of the glass container 100 at the crack re-direction region 130. The crack re-direction region 130 includes depression 400 such that the thickness of the glass container 100 within the depression 400 is less than the wall thicknesses $T_W$ throughout a remainder of the barrel 118. In embodiments, the glass container 100 possess a minimum wall thickness $T_{min}$ within the depression 400. The minimum wall thickness $T_{min}$ may be determined based on the overall size and composition of the glass container 100. In embodiments, the crack re-direction region 130 includes a plurality of depressions 400 above and below (e.g., in the axial direction A, into the page in FIG. 4A) the depression 400 to generate a stress field that is increased in the axial direction over a circumferential direction to redirect a crack propagating through the glass container 100.

For example, FIGS. 4B and 4C depict cross-sectional views of an embodiment of the crack re-direction region 130 at the line II-II of FIG. 1. As shown, the crack re-direction region 130 includes a plurality of depressions 400 extending in the axial direction 402. The plurality of depressions 400 are separated by peaks 404 such that the thickness of the glass container 100 varies in accordance with a sinusoid within the crack re-direction region 130. Within the crack re-direction region 130, the glass container 100 has a minimum thickness $T_{min}$ at the troughs 406 within each depression 400 and a maximum thickness $T_{max}$ at the peaks between the depressions 400. In embodiments, $T_{max}$ equals the wall thickness $T_W$ of the remainder of the glass container 100. In embodiments, $T_{min}$ equals the wall thickness $T_W$ of the remainder of the glass container 100. In embodiments, the average thickness of the glass container 100 within the crack re-direction region 130 equals the wall thickness $T_W$ of the remainder of the glass container 100.

FIG. 4B depicts an axial stress profile (e.g., extending in the axial direction) of the glass container 100 within the crack re-direction region 130. FIG. 4C depicts a circumferential stress profile e (e.g., extending in the circumferential direction) of the glass container 100 within the crack re-direction region 130. As depicted in FIG. 4B, within the crack re-direction region 130, the axial stress profile includes areas of maximum axial stress at the troughs 406 (corresponding to local minimums in the thickness of the glass container 100, where the thickness equals $T_{min}$ in example depicted). As depicted in FIG. 4C, within the crack re-direction region 130, the circumferential stress profile includes areas of maximum circumferential stress at the peaks 404 (corresponding to local maximums in the thickness of the glass container 100) where the thickness equals $T_{max}$ in the example depicted. In embodiments, unlike the remainder of the glass container 100, which has a substantially consistent wall thickness $T_W$, the axial stress at the troughs 406 may be greater than the circumferential stress at the peaks 404 within the crack re-direction region 130. As such, multiple points of maximum axial stress at each of the troughs 406 supply tensile stress in the axial direction to re-direct cracks propagating through the crack re-direction region 130 in the circumferential direction.

Various aspects of the crack re-direction region 130 may be varied in accordance with the embodiments depicted in FIGS. 4A, 4B, and 4C to vary the stress field for a particular crack re-direction effect. For example, varying the amplitude of the sinusoid (e.g., the difference between $T_{max}$ and $T_{min}$) or a period P of the sinusoid may impact a stress direction differential to alter propagation paths for cracks propagating from various origination points on the glass container 100 (e.g., reducing the period P may increase the tensile stress in the axial direction). It should be appreciated that the thickness variations within the crack re-direction region 130 may not vary as a sinusoid in certain embodiments, but rather include any distribution of the thickness variations having different minimum and maximum thicknesses.

Figure 5:
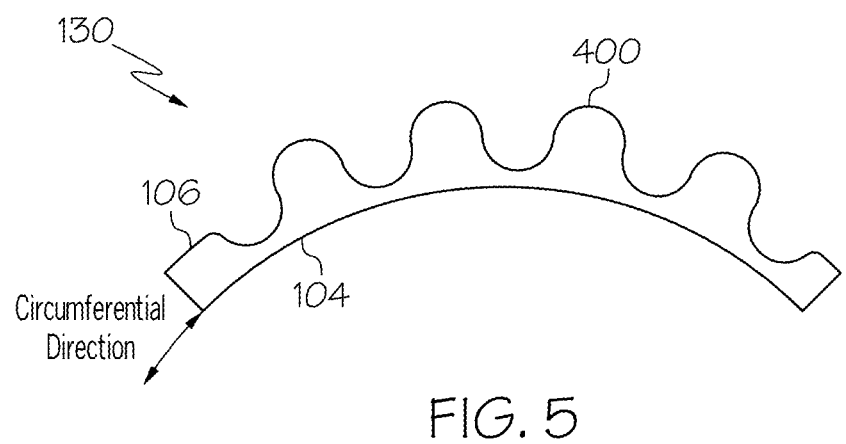
FIG. 5 schematically depicts a cross section of an alternative crack re-direction region of FIG. 1, according to one or more embodiments described herein.

Referring to FIG. 5, in embodiments, the crack re-direction region 130 may also extend in the circumferential direction (e.g., extending tangential to the inner surface 104) around a circumference of the glass container 100 so that cracks originating from any circumferential portion of the glass container 100 may be redirected via the crack re-direction region 130. As depicted in FIG. 5, the crack re-direction region 130 includes a plurality of depressions 400 similar to those described herein with respect to FIGS. 4A, 4B, and 4C extending as a sinusoid in the circumferential direction. In embodiments, the crack re-direction region 130 extends around an entirety of the circumference of the glass container 100 in the circumferential direction. An axial crack (e.g., extending in the axial direction or into or out of the page in FIG. 5) encountering such a crack re-direction region 130 may be redirected to separate the glass container 100, rendering the glass container 100 unusable for its intended purpose. In embodiments, rather than a single crack re-direction region 130 extending around an entirety of the glass container 100, the glass container 100 may contain a plurality of discrete crack re-direction regions, with each crack re-direction region only extending around a portion of the glass container 100.

Crack re-direction regions having different positions on glass containers and possessing different structures than the crack re-direction region 130 described herein are contemplated and possible. FIGS. 6A-6H, for example, depict cross-sectional views of a glass container 600 having a neck region 602 and a plurality of different crack re-direction regions therein. For example, FIG. 6A depicts an embodiment of the glass container 600 including a crack re-direction region 608 including a notch in the neck region 602. The glass container 600 possesses a reduced thickness in the crack re-direction region 608 to create a central tension differential in the axial direction to redirect axial cracks in a circumferential direction.

FIG. 6B depicts an embodiment of the glass container 600 including a crack re-direction region 610 including a plurality of grooves on both an inner surface 606 and an outer surface 604 of the neck region 602. Including grooves on both the inner surface 606 and the outer surface 604 may cause additional peaks in axial stress to increase the probability of a crack propagating through the crack re-direction region 610 being redirected in a circumferential direction. Including grooves on both the inner surface 606 and the outer surface 604 may also reduce the overall thickness of the glass container 600 within the crack re-direction region 610, which may increase the residual tensile stress differential in the axial and circumferential directions.

FIG. 6C depicts an embodiment of the glass container 600 including a crack re-direction region 612 including grooves in the inner surface 606 and outer surface 604 at a transition region between the neck region 602 and a shoulder region 614 of the glass container 600. Such poisoning of the grooves may position a segment of minimal thickness at the base of the neck region 602 such that the neck region 602 may separate from the remainder of the glass container 600 in the event of a crack propagating through the neck region 602. FIG. 6D depicts an embodiment of the glass container 600 including a crack re-direction region 616 including grooves in the inner surface 606 and outer surface 604 at a transition region between the neck region 602 and a flange 618. Such poisoning of the grooves may position a segment of minimal thickness at the base of the flange 618 such that the flange 618 may separate from the remainder of the glass container 600 in the event of a crack propagating through the neck region 602 or the flange 618.

FIG. 6E depicts an embodiment of the glass container 600 including a crack re-direction region 620 including rims protruding from both the inner surface 606 and the outer surface 604. Incorporation of such rums may concentrate stress during a process of ion exchange of the glass container and thereby induce an axial differential in tensile stress. Such an implementation may be beneficial in that it may preserve structural strength of the neck region 602 by not requiring a region of diminished thickness. FIG. 6F depicts an embodiment of the glass container 600 including a crack re-direction region 622 including gradual concavities on both the inner surface 606 and the outer surface 604 of the neck region 602.

FIG. 6G depicts an embodiment of the glass container 600 including a crack re-direction region 624 including a concavity on the outer surface 604 within the shoulder region 614. Such positioning of the crack re-direction region 624 may cause separation of the glass container 600 at the shoulder region 614 in the event of a crack axially propagating through a barrel portion 626 of the glass container. FIG. 6H depicts an embodiment of the glass container 600 including a crack re-direction region 628 including an opening in the neck region 602. The opening creates two regions of minimal thickness (e.g., a first between the inner surface 606 and the opening and a second between the outer surface 604 and the opening) within the crack re-direction region 628 to create multiple axial peaks in residual tensile stress therein. In embodiments, the opening may include a material having a lower CTE than the glass composition in contact with the opening to further enhance tensile stress.

It should be appreciated that any of the crack re-direction regions described with respect to FIGS. 6G-6H may include features on either the inner surface 606, the outer surface 604, or both the inner surface 606 and the outer surface 604. Moreover, any of the crack re-direction regions described with respect to FIGS. 6G-6H may be positioned at any location on the glass container 600 (e.g., in the barrel portion 626, at a heel portion, etc.).

In embodiments, the crack re-direction regions described herein may not include variations in glass container thickness, but include other features that alter the residual stress fields in a glass container. For example, in embodiments, a crack re-direction region may be formed through surface blocking of ions (e.g., potassium ions) during ion exchange strengthening to create variations in residual tensile stress in the axial direction to induce crack re-direction. In another example, density variations within glass containers may be used to form crack re-direction regions. Areas of reduced density within the glass container may result in an increased depth of compressive layers resulting from ion exchange strengthening to create areas of increased tensile stress. In embodiments, crack re-direction regions may be formed by subjecting selected regions of glass containers to differential annealing or cooling. For example, in certain embodiments, the crack re-direction may be formed by shielding a region of the glass container during annealing heat treatments (e.g., after initial formation of the glass container), by contacting a desired region of the glass container with a cooling tool during the conversion of a stock material (e.g., tubing) into the glass container, or during a post heating/cooling process after bulk annealing of the glass container. Any technique capable of forming a directional residual tensile stress in a desired region of the glass container may be used to form a crack re-direction region described herein. In embodiments, the crack re-direction region may be formed by localized modification of fictive temperature through flame or laser processing. In embodiments, energy from an energy source (e.g., a flame, laser, or the like) may be incident on a desired location for the crack re-direction region for localized heating. Subsequent cooling of the desired location may result in localized density variations in the glass container, resulting in different stress profiles for the glass container at the crack re-direction region. Such stress profile differences between the crack-redirection regions and other areas of the glass container may be increased through subsequent chemical strengthening (e.g., via ion exchange) to provide a desired crack re-direction effect.

The preceding discussion of the crack re-direction regions described herein have primarily described localized features in a glass container used to create higher regions of residual tensile stress extending in an axial direction of the glass container. Such localized features may extend in any direction to have any desired crack re-direction effect.

Figure 7:
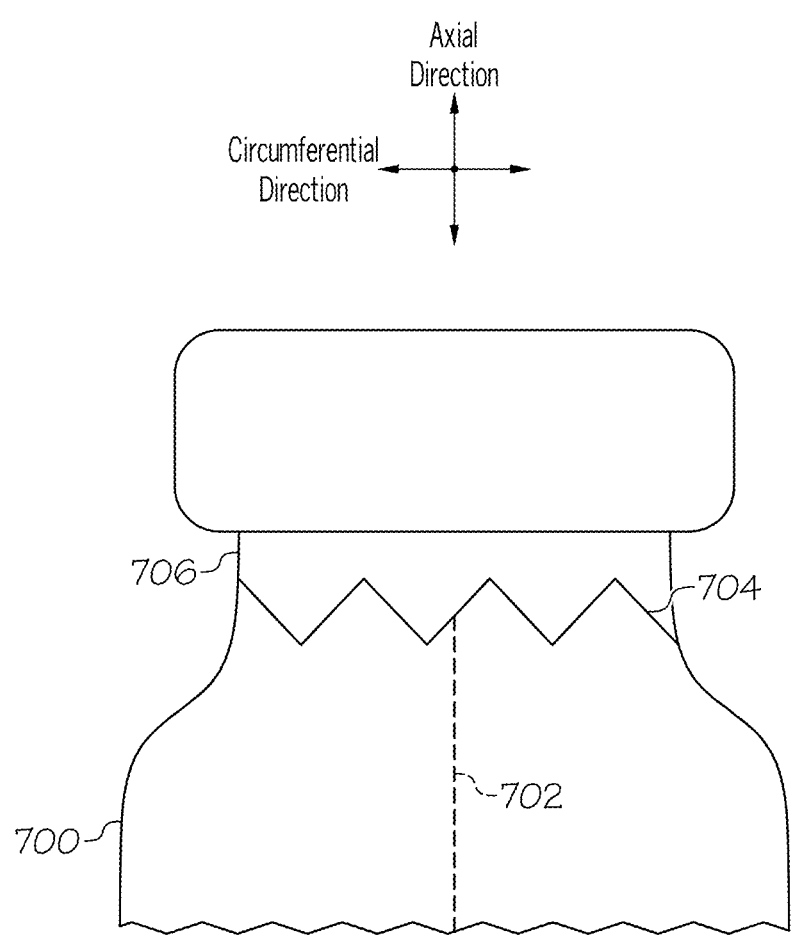
FIG. 7 schematically depicts a glass container including a crack re-direction region, according to one or more embodiments described herein.

For example, FIG. 7 depicts a perspective view of a glass container 700 including a crack 702 propagating in an axial direction through the glass container 700. The glass container 700 includes a crack re-direction region 704 that general extends in a circumferential direction around a neck region 706 of the glass container 700. The crack re-direction region 704 may include any of the features (e.g., depressions, grooves, areas of reduced density). In the depicted embodiment, however, the crack re-direction region 704 does not extend directly in the circumferential direction, but rather along a zig-zag path. For example, the crack redirection region 704 may include a plurality of grooves arranged in a zig-zag pattern (e.g., such that the thickness of the glass container 700 varies in accordance with a sinusoid along the zig-zag pattern). Such a pattern is beneficial in that the crack 702 extending in the axial direction does not intersect the features of the crack re-direction at a 90 degree angle. As such, the angular amount that the crack 702 needs to be turned to extend along the crack re-direction region 704 is less than in embodiments where the crack re-direction region extends in a straight line along the circumferential direction. Such a reduction in the amount of turning required may better promote crack turning.

FIGS. 8A-8D depict embodiments of a glass container 800 including a first crack re-direction feature 802. The first crack re-direction feature 802 may include a plurality of features (e.g., depressions) that extends circumferentially around a neck region of the glass container 800 to redirect axial cracks in a circumferential direction, as described herein. In embodiments, additional crack re-direction features may be added to the crack re-direction region 802 to redirect cracks extending in various different directions.

Figure 8:
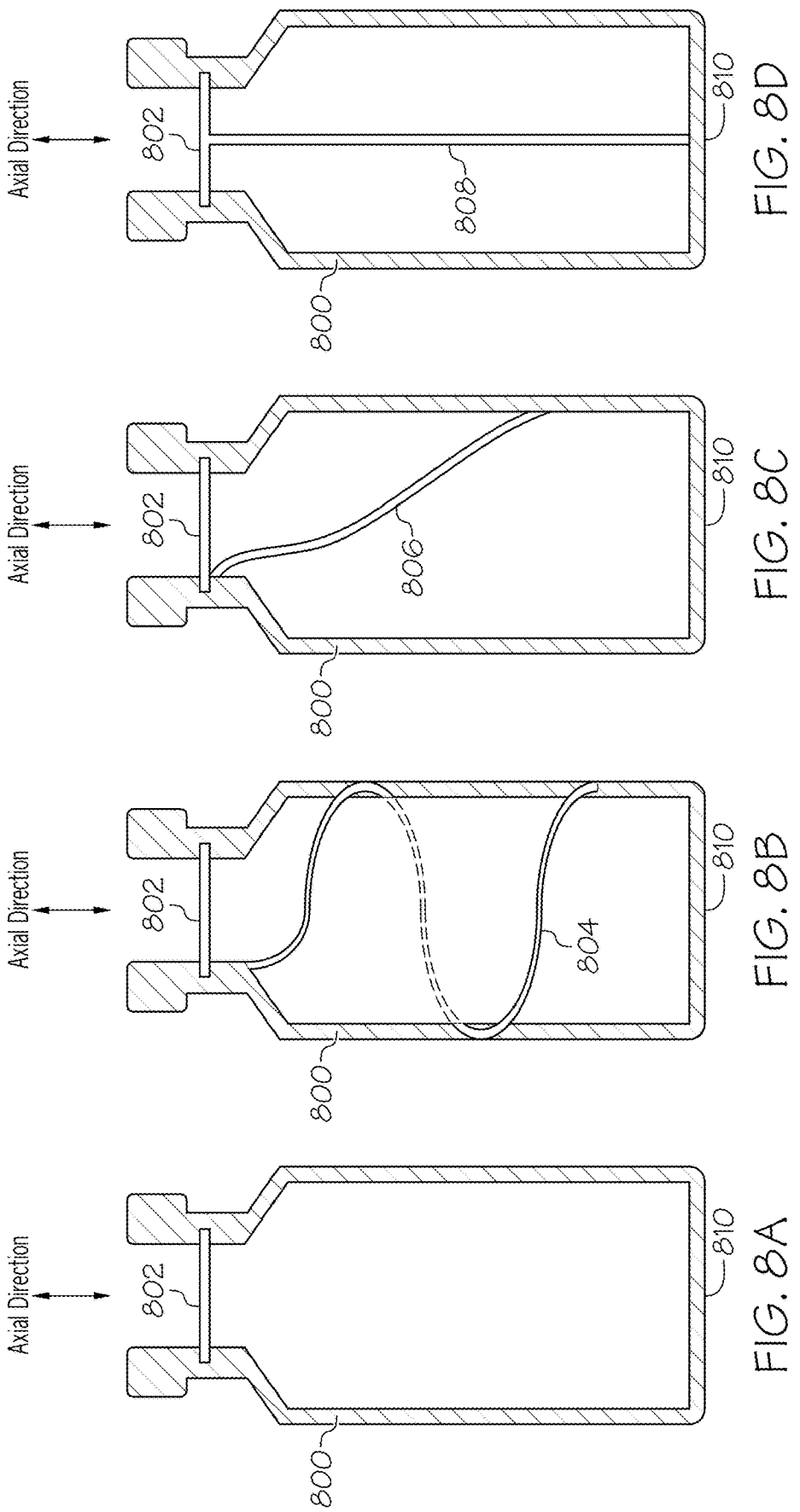
FIG. 8A schematically depicts a glass container including a first crack re-direction region extending in a first direction, according to one or more embodiments described herein.
FIG. 8B schematically depicts the glass container of FIG. 8A including a second crack re-direction extending in a first spiral pattern, according to one or more embodiments described herein.
FIG. 8C schematically depicts the glass container of FIG. 8A including a second crack re-direction extending in a second spiral pattern, according to one or more embodiments described herein.
FIG. 8D schematically depicts the glass container of FIG. 8A including a second crack re-direction extending in a second direction that is perpendicular to the first direction, according to one or more embodiments described herein.

For example, FIG. 8B depicts an embodiment of the glass container 800 that includes a crack re-direction region 804 extending in a first spiral pattern. In embodiments, the crack re-direction region 804 includes a plurality of features (e.g., grooves, depressions, concavities) extending along the crack re-direction region 804. The first spiral pattern may be relatively tight such that the crack re-direction region 804 extends around an entirety of the circumference of the glass container at least once between the floor portion 810 of the glass container and the crack re-direction region 802. Such a pattern facilitates cracks originating at any axial position within the glass container 800 encountering the crack re-direction region 804 at an angle of less than 90 degrees, which promotes re-direction of the cracks in a noticeable manner so that that the glass container 800 may be discarded if defective.

FIG. 8C depicts an embodiment of the glass container 800 that includes a crack re-direction region 806 extending in a second spiral pattern. As compared to the first spiral pattern described with respect to FIG. 8B, the second spiral pattern extends at a smaller angle relative to the axial direction, and generally promotes redirection of cracks propagating in the axial direction. FIG. 8D depicts an embodiment of the glass container 800 that includes a crack re-direction region 808 extending in the axial direction to promote redirection of cracks propagating in a circumferential direction around the glass container in an axial direction. The crack re-direction region 808 may expose cracks that are hidden by an adhesive label disposed on an outer surface of the glass container 800.

Figure 9:
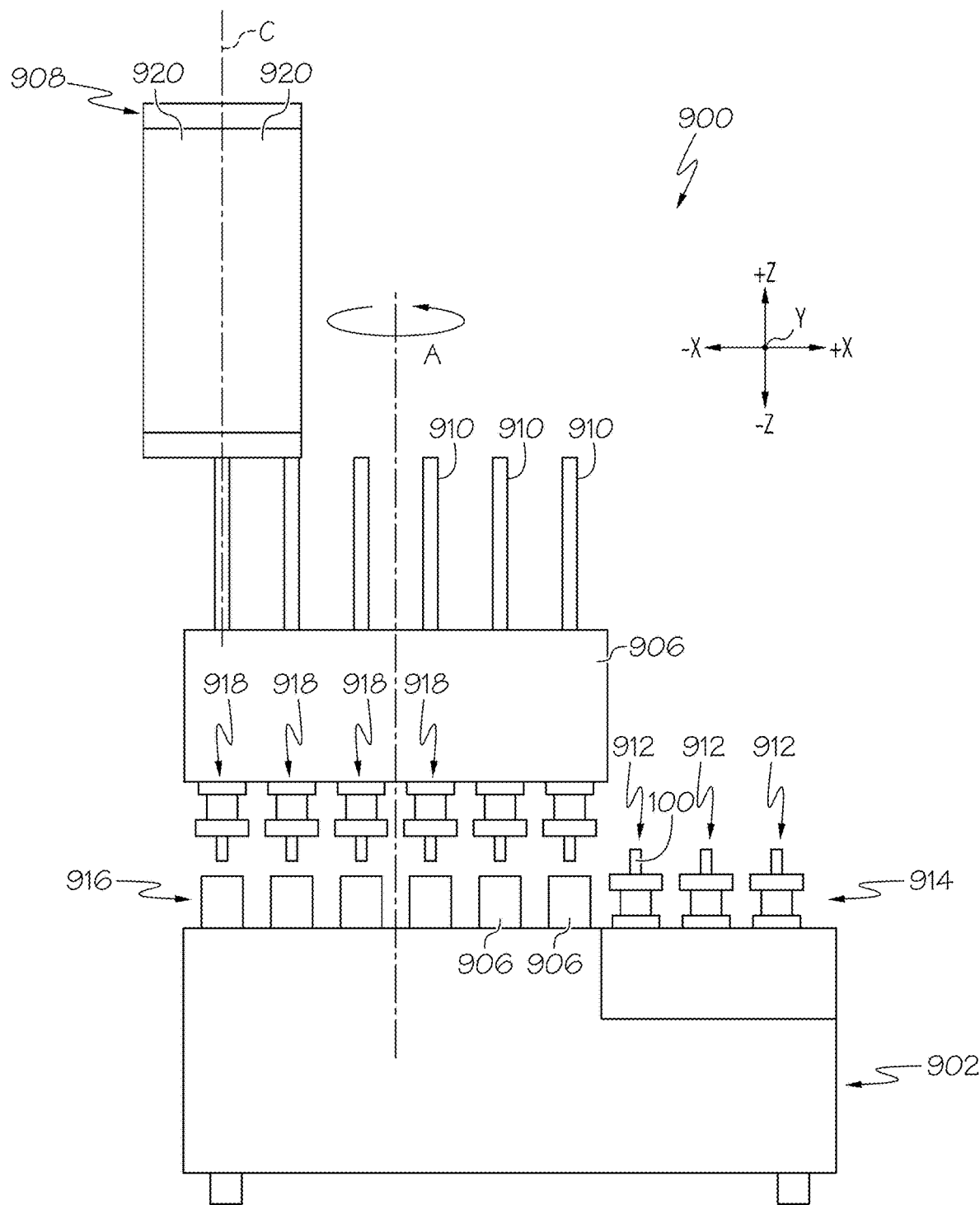
FIG. 9 schematically depicts a converter for converting glass tubing into a glass container, according to one or more embodiments described herein.

In embodiments, the crack re-direction regions described herein may be formed during a process of converting a stock material (e.g., glass tubing) into a glass container. Such a conversion process is described in greater detail herein with respect to FIG. 9. FIG. 9 depicts a converter 900 that may be used for generating glass articles, such as the glass container 100 described herein with respect to FIG. 1 from glass tubing. It should be appreciated that the converter 900 depicted is exemplary only and not intended to be limiting. The glass containers described herein may be formed through any type of conversion process. The converter 900 includes a base 902 having a plurality of processing stations 904, a main turret 906 positioned above the base 902 and rotatable relative to the base 902 about the central axis A, and a glass tube loading turret 908 positioned above the main turret 906 for feeding glass tubing 910 to the main turret 906. The converter 900 may also include a plurality of secondary processing stations 912 on the base 902 and a secondary turret 914, which is rotatable relative to the base 902.

The plurality of processing stations 904 are spaced apart from one another and arranged in a main circuit 916. In one or more embodiments, the main circuit 916 may be circular so that the main turret 906 may index the glass tubing 910 through the plurality of processing stations 904 by rotation of the main turret 906 about the central axis A. Alternatively, in other embodiments, the main circuit 916 may be linear. Although described herein in reference to a circular-shaped layout of processing stations 904, it is understood that the subject matter disclosed herein may apply equally well to converters having other arrangements of the processing stations 904. The plurality of processing stations 904 may include any number of processing stations depending on the implementation. The processing stations 904 may include, by way of example and without limitation, one or more heating, forming, polishing, cooling, separating, piercing, re-cladding, trimming, measuring, feeding, or discharge stations or other processing stations for producing the glass articles from the glass tubing 910. The type and/or shape of the article to be made from the glass tubing 910 may also influence the type of processing stations 904 and/or order of processing stations 904 of the converter 900.

The main turret 906 includes a plurality of holders 918, which are configured to removably secure each glass tubing 910 to the main turret 906. The holders 918 may be clamps, chucks, or other holding devices, or combinations of holding devices. The holders 918 may orient each piece of glass tubing 910 so that the glass tubing 910 is generally parallel to the central axis A of the main turret 906. The glass tube loading turret 908 may include a plurality of loading channels 920 arranged in a circular circuit and configured to hold lengths of the glass tubing 910 The glass tube loading turret 908 may be positioned to orient one of the loading channels 920 into vertical alignment (i.e., aligned in a direction parallel to the central axis A of the main turret 906 and/or parallel to the Z axis of FIG. 9) with a processing station 904 of the main circuit 916 of the converter 900 and the corresponding holders 918 on the main turret 906 that are indexed through the processing station 904 of the main circuit 916.

Figure 10:
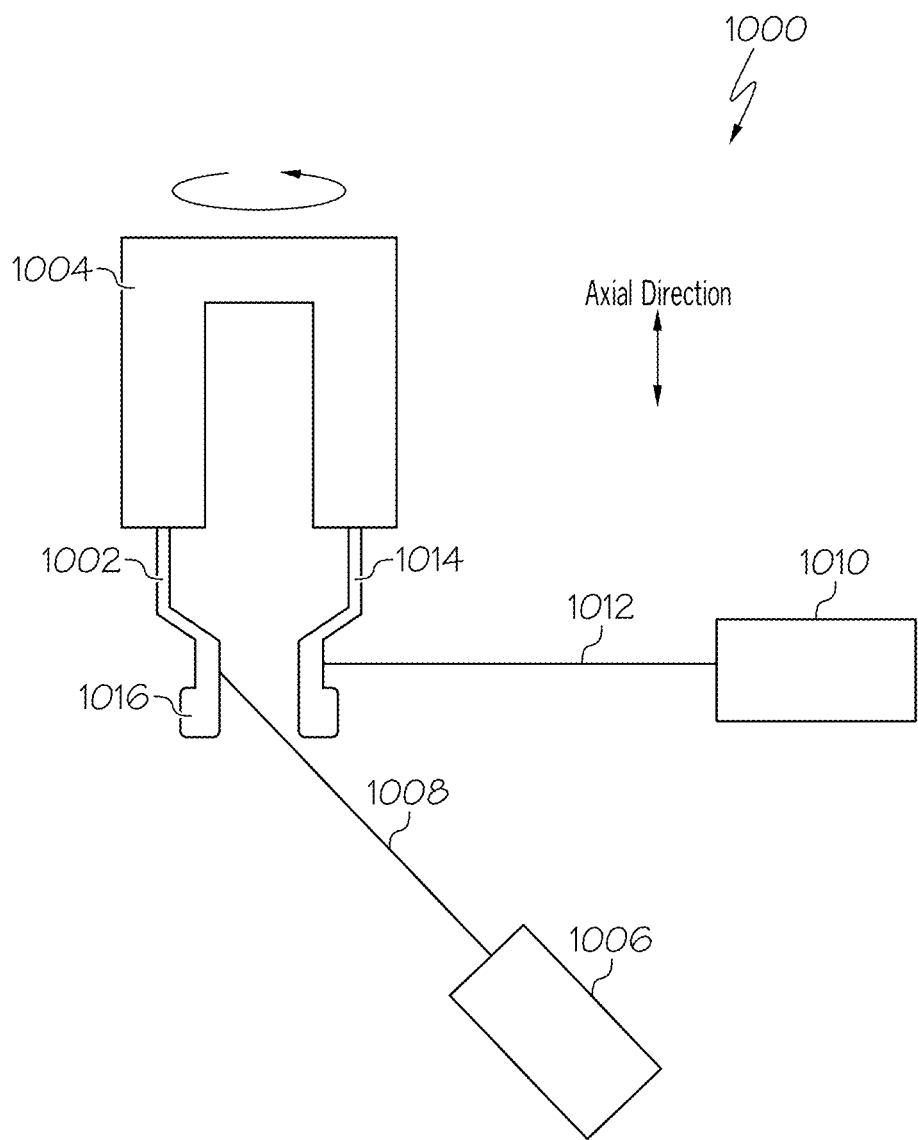
FIG. 10 schematically depicts a processing station of the converter depicted in FIG. 9, according to one or more embodiments described herein.

Referring now to FIG. 10, a processing station 1000 is schematically depicted. In embodiments the processing station 1000 is one of the processing stations 904 of the converter 900 described herein with respect to FIG. 9. For example, in embodiments, the processing station 1000 may be positioned within the main circuit 916 after a first one of processing stations 904 that is a heating station and a second one of the processing stations 904 that is a forming station. As depicted in FIG. 10, a partially formed glass container 1002 is secured to a holder 1004 (e.g., corresponding to one of the holders 918 described herein with respect to FIG. 9). In embodiments, the first one of processing stations 904 that is a heating station may initially preheat glass tubing to a target temperature (e.g., a softening point or working point) at which the glass tubing becomes plastically deformable and may be effectively shaped without cracking or shattering the glass. After the glass tubing is preheated, the second one of the processing stations 904 that is a forming station (or a plurality of forming stations in addition to a separating station) may form the glass tubing into the partially formed glass container 1002.

After the glass tubing is formed into the partially formed glass container 1002, the partially formed glass container 1002 may be subjected to an additional processing station 904 to reheat the container. In embodiments, after the glass tubing is formed into the partially formed glass container 1002, the partially formed glass container 1002 may be transferred to the processing station 1000 to form a crack re-direction region.

As depicted in FIG. 10, the processing station 1000 includes a first laser beam source 1006 emitting a first laser beam 1008 and a second laser beam source 1010 emitting a second laser beam 1012. The processing station 1000 may beneficially be positioned within the converter 900 such that, when the partially formed glass container 1002 reaches the processing station 1000, the partially formed glass container 1002 is at an elevated temperature (e.g., above a softening point of the glass composition of which the partially formed glass container 1002 is constructed). Such an elevated temperature facilitates use of relatively lower power laser beam sources for the first and second laser beam sources 1006 and 1010. In embodiments, the first and second laser beam sources 1006 and 1010 are $CO_2$ laser sources emitting pulsed laser beams 1008 and 1012. The pulsed laser beams 1008 and 1012 may have various different pulse lengths and spot sizes, depending on the properties of the crack re-direction region desired to be formed. For example, the pulse length and/or power of the first and second laser beam sources 1006 and 1010 may be adjusted based on a desired minimum thickness of the glass container within the crack re-direction region (e.g., the value of $T_{min}$ described with respect to FIGS. 4A, 4B, and 4C). A spot size of the pulsed laser beams 1008 and 1012 may be adjusted (e.g., using optics—not depicted—positioned between the laser beam sources 1006 and 1012) based on a desired size of thickness variation within the crack re-direction region (e.g., the period P described with respect to FIG. 4C).

The second laser beam 1012 is directed to an outer surface 1014 of the partially formed glass container 1002. As such, the second laser beam source 1010 may be used to form depressions (e.g., the depressions 400 described herein with respect to FIGS. 4A, 4B, and 4C) on the outer surface 1014. In embodiments, the partially formed glass container 1002 and the second laser beam 1012 may be moved relative to one another (e.g., via a scanning element, not depicted, positioned between the second laser beam source 1010 and the partially formed glass container 1002) to form a desired pattern of depressions on the outer surface 1014. In embodiments, the holder 1004 rotates while the partially formed glass container 1002 is in the processing station 1000 such that any pattern of depressions may be formed around an entirety of the circumference of the partially formed glass container 1002. In embodiments, the relative positioning between the partially formed glass container 1002 and the second laser beam 1012 may be adjusted in the axial direction (e.g., via the scanning element, via the holder 1004 translating in the axial direction) to form crack re-direction features at any axial location on the outer surface 1014. Depressions may be formed in an inner surface 1016 of the partially formed glass container 1002 via the first laser beam 1008 in a similar manner.

Still referring to FIG. 10, it should be appreciated that the processing station 1000 may include any number of laser beam sources depending on the implementation. For example, in embodiments, the processing station 1000 may include a plurality of laser beam sources positioned at various axial locations of the partially formed glass container 1002 for simultaneously forming multiple crack re-direction regions on the outer surface 1014 and the inner surface 1016. In embodiments, a single laser beam source may be used to form crack re-direction regions on both the inner surface 1016 and the outer surface 1014.

Alternative processing stations for forming the crack re-direction regions described herein during a conversion process are also envisioned. For example, one processing station may include a shaping or forming element that mechanically contacts a surface (e.g., the outer surface 1014 and the inner surface 1016) of the partially formed glass container 1002 while the partially formed glass container 1002 is at an elevated temperature. The forming element may have a surface including a first portion that conforms with a surface (e.g., the outer surface 1014) of the partially formed glass container 1002 and a second portion shaped to correspond to a desired profile (e.g., depression, rim) of a feature of the crack re-direction region. The forming element may be pressed into the partially formed glass container 1002 at various locations to form the crack re-direction regions described herein. Another alternative processing station may include a localized heat source (e.g., a laser beam, a flame) to locally modify a fictive temperature in a region of partially formed glass container 1002 to form a crack re-direction region.

While the preceding examples describe forming the crack re-direction regions herein during a conversion process for converting glass tubing into glass containers, it should be understood that the crack re-direction features described herein may be formed at different times. For example, any of the crack re-direction features may also be formed after the conversion process during a step where a finished glass container is heated.

Figure 11:
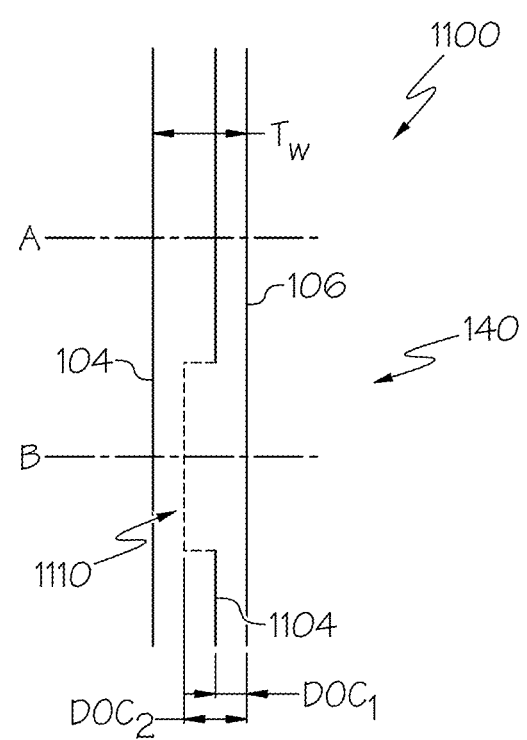
FIG. 11 schematically depicts the localized compressive stress region of the glass container depicted in FIG. 1, according to one or more embodiments described herein.

Referring now to FIG. 11A, the region 1100 of the glass container 100 described with respect to FIG. 1 is schematically depicted according to an example embodiment. The region 1100 includes the localized compressive stress region 140. In the depicted embodiment, the glass container 100 includes a compressively stressed layer 1104 extending throughout the region 1100. In embodiments, the compressively stressed layer 1104 may be formed in any of the manners described herein with respect to the compressively stressed layer 202 depicted in FIG. 2. In embodiments, the glass container 100 may not include the compressively stressed layer 1104. For example, in embodiments where the glass container is relatively large (e.g., defining an internal volume of greater than or equal to 20 ml and less than or equal to 50 ml), the glass container 100 may not be chemically strengthened via ion exchange and not include the compressively stressed layer 1104, provided that localized compressive stress regions are located at commonly contacted regions of the glass container (e.g., the heel region 114, the neck region 124, the shoulder region 116). That is, the localized compressive stress regions described herein may eliminate the need to ion exchange certain glass containers and reduce processing costs.

In the embodiment depicted in FIG. 11A, the compressively stressed layer 1104 extends from the outer surface 106 into the wall thickness of the glass container 100 to a first depth of compression $DOC_1$. In embodiments, the glass container 100 is under a maximum compressive stress $CS_{max}$ at the outer surface 106. The value of the maximum compressive stress $CS_{max}$ may vary depending on the manner with which the compressively stressed layer 1104 is formed and the composition of the glass container 100. For example, in embodiments, the maximum compressive stress $CS_{max}$ may range from 50 MPa to 750 MPa (e.g., 750 MPa, 700 MPa, 500 MPa, 400 MPa, 300 MPa, 200 MPa, 100 MPa, 50 MPa, or any of the values in between).

At the line A depicted in FIG. 11A, the residual stress profile of the glass container 100 turns tensile at the first depth of compression $DOC_1$. That is, the compressively stressed layer 1104 extends from the outer surface 106 into the wall thickness $T_W$ to the first depth of compression $DOC_1$. The first depth of compression $DOC_1$ may vary depending on the implementation. In embodiments where the compressively stressed layer 1104 is formed by ion exchange, for example, the first depth of compression $DOC_1$ may be greater than or equal to about 3 µm. In some embodiments, the depth of layer may be greater than or equal to about 25 µm or even greater than or equal to about 30 µm. For example, in some embodiments, the first depth of compression $DOC_1$ may be greater than or equal to about 10 µm and greater than or equal to about 200 µm. In some other embodiments, the first depth of compression $DOC_1$ may be greater than or equal to about 30 µm and less than or equal to about 150 µm. In yet other embodiments, the first depth of compression $DOC_1$ may be greater than or equal to about 30 µm and less than or equal to about 80 µm. In some other embodiments, the first depth of compression $DOC_1$ may be greater than or equal to about 35 µm and less than or equal to about 50 µm. In embodiments, the compressively stressed layer 1104 may be formed in a cladding layer of laminated glass. In such embodiments, the cladding layer may also be subjected to ion exchange strengthening to create a superimposed compressive stress profile within the compressively stressed layer 1104.

In embodiments, the first depth of compression $DOC_1$ may extend less than or equal to or equal to 25% into the wall thickness $T_W$ of glass container 100 from the outer surface 106. In embodiments, the first depth of compression $DOC_1$ may be less than or equal to 2% of the wall thickness $T_W$, less than or equal to 3% of the wall thickness $T_W$, less than or equal to 5% of the wall thickness $T_W$, less than or equal to 10% of the wall thickness $T_W$, less than or equal to 15% of the wall thickness $T_W$, less than or equal to 20% of the wall thickness $T_W$, less than or equal to 25% of the wall thickness $T_W$, or any of the values therebetween.

As depicted in FIG. 11A, within the localized compressive stress region 140, the glass container 100 is under a compressive stress to a second depth of compression $DOC_2$ that is greater than the first depth of compression $DOC_1$ of the compressively stressed layer 1104. As such, within the localized compressive stress region 140, residual compressive stress extends deeper into the wall thickness $T_W$ than in regions of the glass container 100 outside of (or adjacent to) the localized compressive stress region 140. Given that surface flaws imparted on the outer surface 106 may branch and propagate under tensile stress, such a greater depth of compressive stress within the localized compressive stress region 140 may increase the breakage resistance of the glass container 100. That is, the greater depth of compressive stress within the localized compressive stress region 140 effectively increases the threshold amount of damage needed to cause failure of the glass container 100. As such, since the localized compressive stress region 140 is positioned proximate to the heel region 114 of the glass container 100 (see FIG. 1), the glass container 100 is effectively rendered more durable against contact with external items (e.g., holders, other glass containers, etc.) within the heel region 114.

In embodiments, the localized compressive stress region 140 is formed by applying localized thermal strengthening treatments to a portion of the glass container 100. For example, the glass container 100 may be heated to a target temperature (e.g., to a softening point) and then rapidly cooled in a controlled manner (e.g., exposing the outer surface 106 to coolant such as a gas or liquid). Such rapid cooling causes the surface layer of the glass container 100 exposed to the coolant to harden, with the interior of the glass container 100 being in a softer state. The cooled surface layer forms a rigid structure preventing the interior of the glass container 100 from contracting when cooled, causing a region of tension that counteracts the compressive state of the surface layer exposed to the coolant. Such localized thermal strengthening treatments may result in a depth of compressive stress that is greater than can be attained through chemical strengthening techniques like ion exchange.

In embodiments, the stress profile of the compressive stress within the localized compressive stress region may differ from stress profile of the compressive stress that is external to the localized compressive stress region 140 as a result of the localized thermal strengthening treatments applied to the localized compressive stress region 140. In embodiments, the compressive stress within the localized compressive stress region 140 is substantially parabolic in shape and is compressive at a distance of approximately 20% of the wall thickness $T_W$. In embodiments, the second depth of compression $DOC_2$ is greater than the first depth of compression $DOC_1$ outside of the localized compressive stress region 140. In the example depicted, the compressively stressed layer 1104 overlaps (or extends through) the localized compressive stress region 140. Such a structure may result from a process where the glass container 100 is subjected to localized thermal strengthening treatments (e.g., in a cooling processing station of the converter 900 described with respect to FIG. 9) to form the localized compressive stress region 140, followed by chemical strengthening by ion exchange. As a result, the outer surface 106 at the localized compressive stress region 140 may be exposed to thermal strengthening treatments and ion exchange In embodiments, exposure to both ion exchange and thermal strengthening treatments may result in a maximum compressive stress at the outer surface 106 that is greater within the localized compressive stress region 140 than external to the localized compressive stress region 140.

While the preceding example includes a compressively stressed layer 1104 and a localized compressive stress region 140, it should be appreciated that various alternative embodiments are envisioned. For example, certain embodiments may not include the compressively stressed layer 1104 extending throughout the glass container 100. The localized compressive stress region 140 may be also be formed through localized chemical strengthening such that the second depth of compression $DOC_2$ may be less than depicted in FIG. 11B in certain embodiments. For example, in embodiments where a local ion exchange treatment is used to form the localized compressive stress region 140, the second depth of compression $DOC_2$ may be less than 3% (e.g., 1%, 2%, 2.5%) of the wall thickness $T_W$. The second depth of compression $DOC_2$ depends on the method used to form the localized compressive stress region 140 and may vary from being greater than or equal to 2% of the wall thickness $T_W$ to less than or equal to 25% of the wall thickness $T_W$, depending on the implementation.

Additionally, it should be appreciated that the glass containers described herein may include a number of different localized compressive stress regions at various different positions. Certain embodiments of the glass container 100 may include localized compressive stress regions on the inner surface 104. Additionally, the crack re-direction regions described herein may overlap with the localized compressive stress regions. Such a structure is beneficial in that the localized thermal strengthening treatments used to form the localized compressive stress regions may work in concert with the structural variations of the crack re-direction regions to create tensile stress differentials in directions perpendicular to desired propagation directions. Such tensile stress differentials as a result of the overlapping crack re-direction regions and localized compressive stress regions may reduce the amount the structure (e.g., thickness) is modified within the crack re-direction region and preserve structural strength of the glass container 100 while providing a similar crack re-direction effect.

As described herein, the localized compressive stress regions described herein may be formed through localized application of thermal strengthening treatments to the glass container 100. Such treatments are not conventionally applied to glass containers because uniform cooling of complex glass shapes is generally challenging. Thermal strengthening treatments may rely on application of gas coolants to a heated glass surface to uniformly cool the glass and achieve. Referring to FIG. 1, the glass container 100 includes shape complexities (e.g., the flange 126, the shoulder region 116, the heel region 114) that render application of such coolants thereto difficult. As such, it is difficult to achieve the required heat transfer rates when thermally strengthening the entire glass container 100. Additionally, thermal strengthening treatments may be more effective in glass compositions having higher coefficients of thermal expansion (CTE). Conventional glass containers may be constructed of compositions (e.g., alkali borosilicate glasses) that are incompatible with thermal strengthening techniques. Certain glass containers may also have a wall thickness $T_W$ that is greater than or equal to 0.6 mm and less than or equal to 3 mm. Conventional thermal strengthening techniques are also not compatible with such thicknesses due to a lowered heat transfer rate.

In view of this, the glass containers described herein may be constructed of a glass composition that is more amenable to thermal strengthening treatments than compositions of conventional glass containers. In embodiments, the glass containers described herein are constructed of glass compositions having CTEs greater than or equal to $5 \times 10^{-6}$ $C.^{-1}$. With regard to providing the requisite heat transfer rates to achieve the desired depth of compression within the localized compressive stress regions described herein, the present disclosure utilizes several approaches. First, by performing thermal strengthening treatments at only specific regions on the glass container 100, problems stemming from geometrical complexities of the glass container 100 may be avoided. Additionally, coolants may be applied to the glass container to increase heat transfer rates.

Figure 12A:
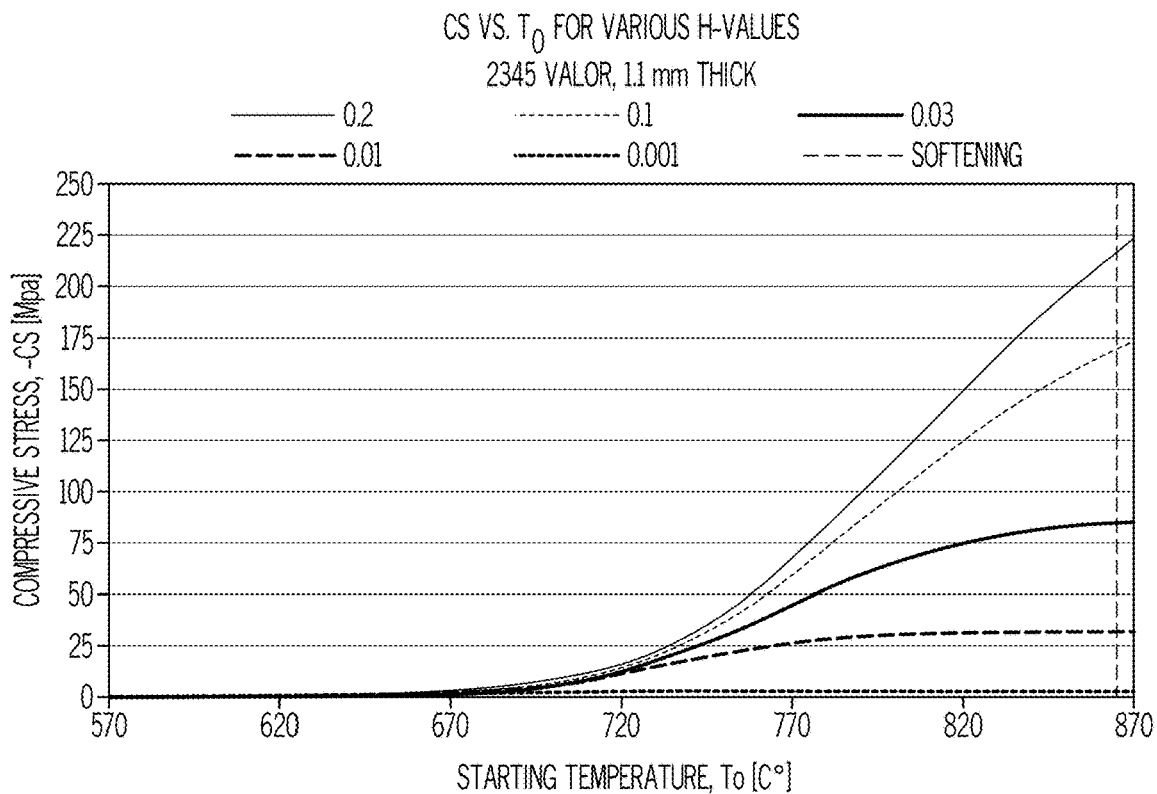
FIG. 12A graphically depicts a compressive stress in a localized compressive stress region as a function of starting temperature and heat transfer coefficient for a glass composition, according to one or more embodiments described herein.

FIGS. 12A, 12B, 12C, and 12D graphically depict various aspects impacting the efficacy of thermal strengthening on the glass containers described herein. FIG. 12A graphically depicts a surface compressive stress (e.g., at the outer surface 106) versus a starting temperature that the glass container is heated to during thermal strengthening. Each curve depicts a transfer coefficient (cal/(cm$^2$*sec*K)) during cooling of the glass. In the depicted embodiment, the glass container 100 is constructed of an alkali aluminosilicate glass composition that generally includes a combination of SiO$_2$ and one or more alkali oxides, such as Na$_2$O and/or K$_2$O. The glass composition may also include Al$_2$O$_3$ and at least one alkaline earth oxide. The glass container 100 has a 1.1 mm wall thickness $T_W$ in the shown example. The glass container 100 was not strengthened with ion exchange in the depicted example.

As depicted in FIG. 12A, the higher the heat transfer coefficient and starting temperature, the greater level of compressive stress at the outer surface 106 within the localized compressive stress region 140. A heat transfer coefficient of 0.2 cal/(cm$^2$*sec*K) provides a compressive stress of about 225 MPa at the outer surface 106. A heat transfer coefficient of 0.001 cal/(cm$^2$*sec*K), in contrast, provides a compressive stress of about 30 MPa at the outer surface. In embodiments, to achieve a desired amount of damage resistance within the localized compressive stress region 140, the compressive stress at the outer surface 106 (e.g., $CS_{max}$ described with respect to FIG. 11B) may be greater than or equal to 50 MPa (e.g., greater than or equal 75 MPa, greater than or equal to 100 MPa, greater than or equal to 125 MPa, greater than or equal to 150 MPa, or greater than or equal to 200 MPa). As such, for the alkali aluminosilicate composition depicted, a starting temperature of greater than or equal to approximately 750° C. may be used. Additionally, a heat transfer coefficient of greater than or equal 0.01 cal/(cm$^2$*sec*K) for cooling the glass container after heated to the starting temperature of at least approximately 750° C. may be used.

Figure 12B:
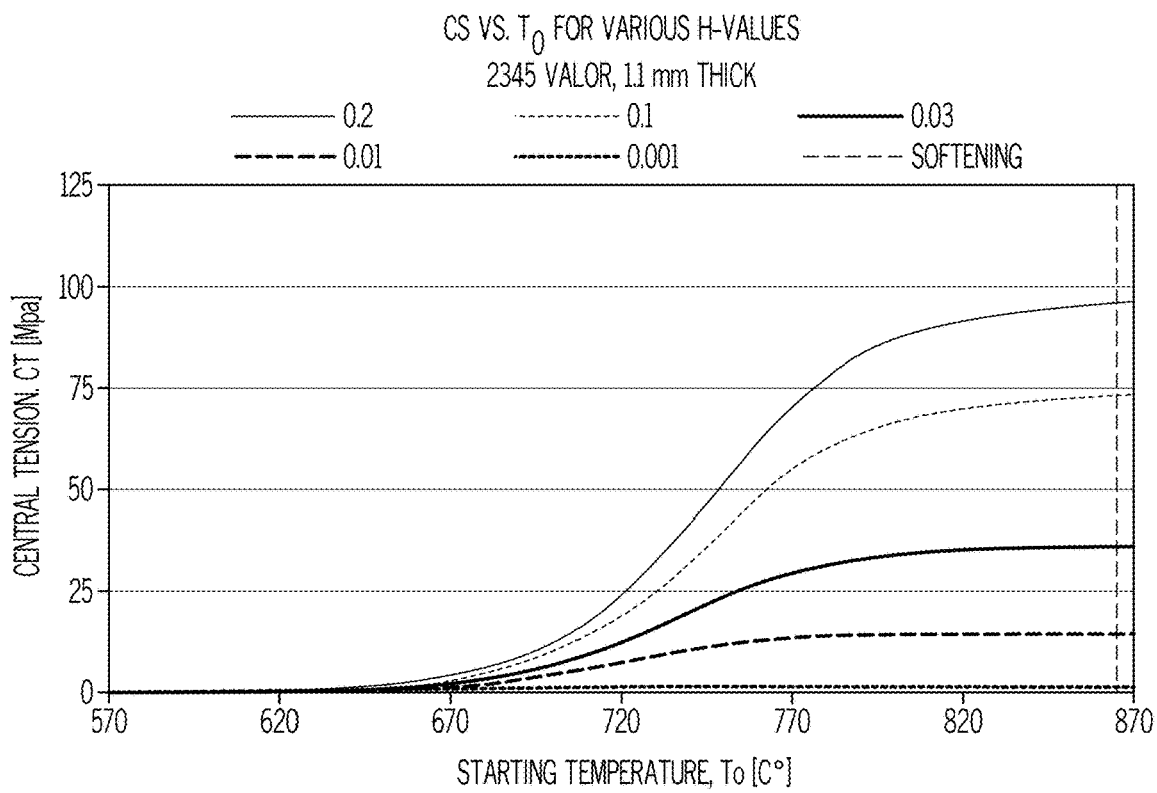
FIG. 12B graphically depicts a central tension proximate to a localized compressive stress region as a function of starting temperature and heat transfer coefficient for the glass composition of FIG. 12A, according to one or more embodiments described herein.
Figure 12C:
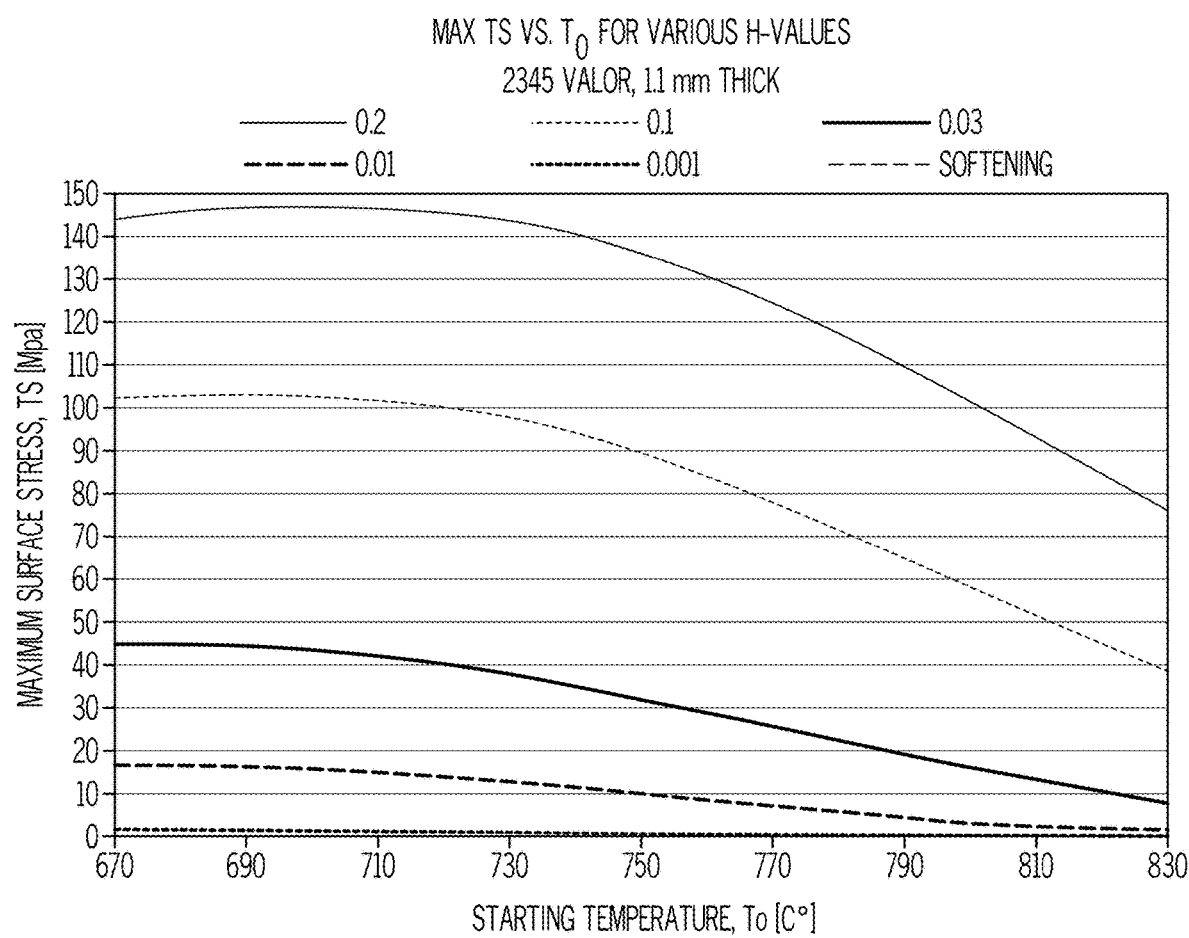
FIG. 12C graphically depicts a transient tensile stress in a localized compressive stress region as a function of starting temperature and heat transfer coefficient for the glass composition of FIG. 12A, according to one or more embodiments described herein.

FIG. 12B graphically depicts various curves of a central tension (e.g., in the adjacent region 1110 described with respect to FIG. 11A) resulting in the glass container 100 from the thermal strengthening treatments describe with respect to FIG. 12A. As depicted, thermal tempering to achieve the desired amount of compressive stress at the outer surface 106 also provides a central tension of greater than or equal to approximately 30 MPa. Such a central tension may facilitate crack branching and propagation if a surface flaw manages to penetrate the localized compressive stress region 140. FIG. 12C graphically depicts various curves of maximum surface tensile stress that occurs during the thermal strengthening treatments described with respect to FIG. 12A. That is, the thermal strengthening treatments described herein result in a transient tensile stress at the outer surface 106. Such a transient tensile stress may separate surface flaws imparted on the glass container during the conversion process, eliminating faulty containers. As depicted, thermal tempering to achieve the desired amount of compressive stress at the outer surface 106 also results in a surface tensile stress of greater than or equal to about 40 MPa, which is sufficient to render the glass container 100 unsuitable for use in the event of a surface flaw being imparted thereon during conversion.

Figure 12D:
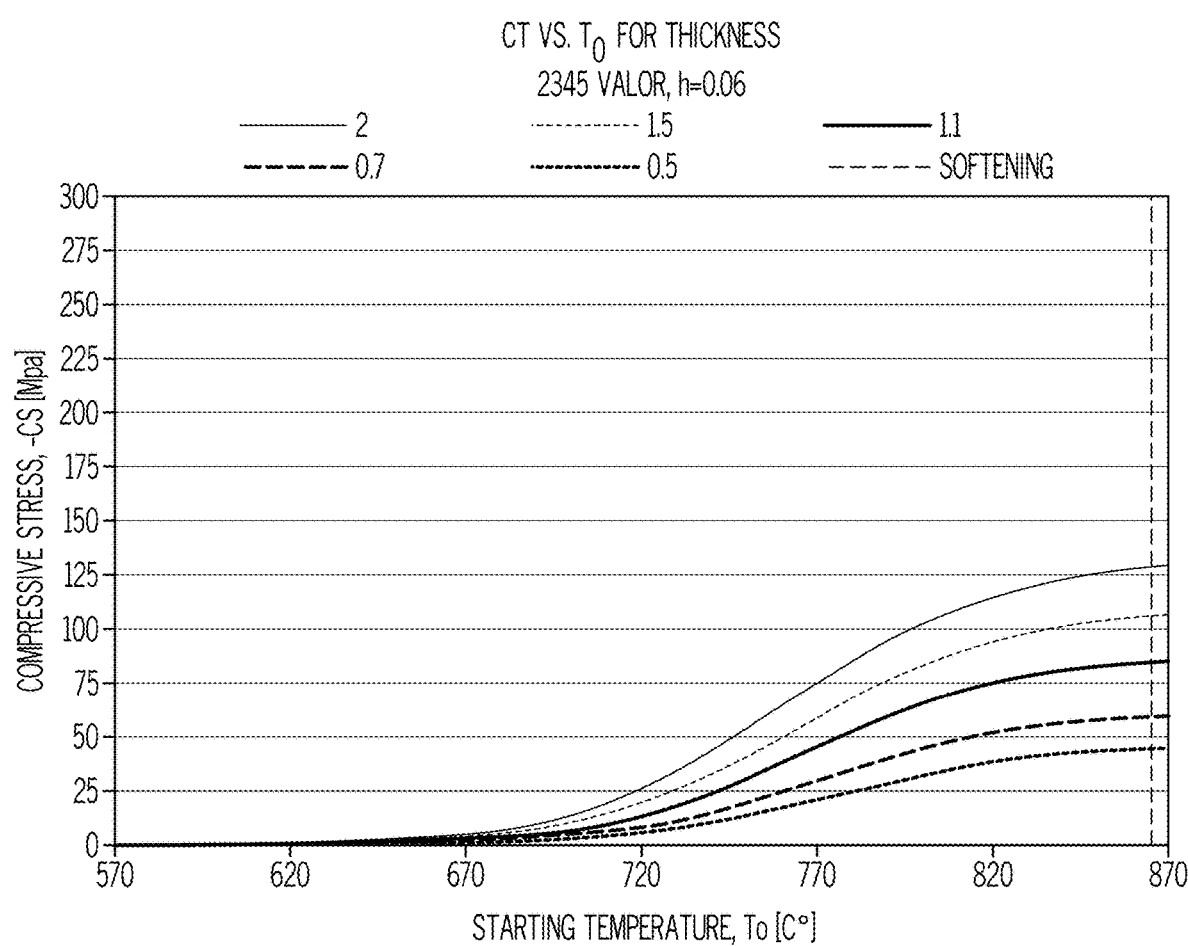
FIG. 12D graphically depicts a compressive stress in a localized compressive stress region as a function of starting temperature and thickness for the glass composition of FIG. 12A, according to one or more embodiments described herein.
Figure 12E:
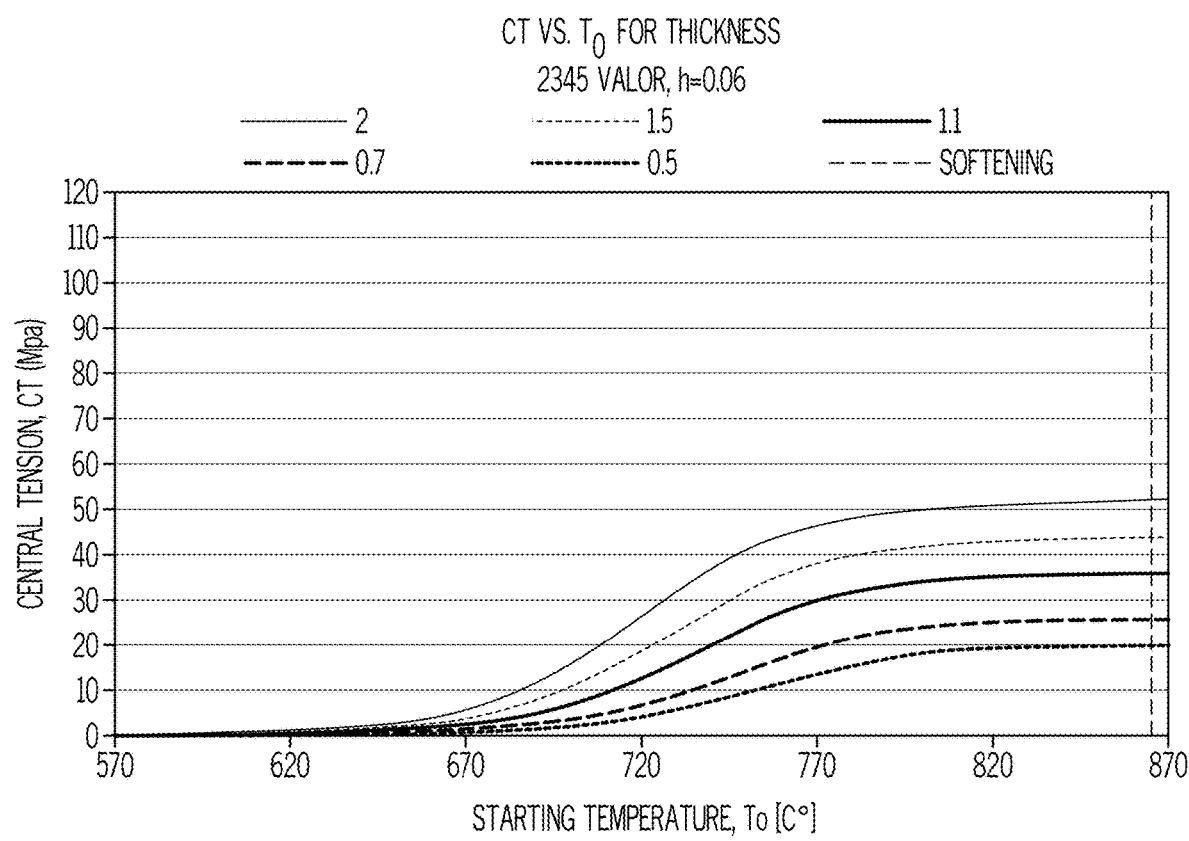
FIG. 12E graphically depicts a tensile stress proximate to a localized compressive stress region as a function of starting temperature and thickness for the glass composition of FIG. 12A, according to one or more embodiments described herein.
Figure 13A:
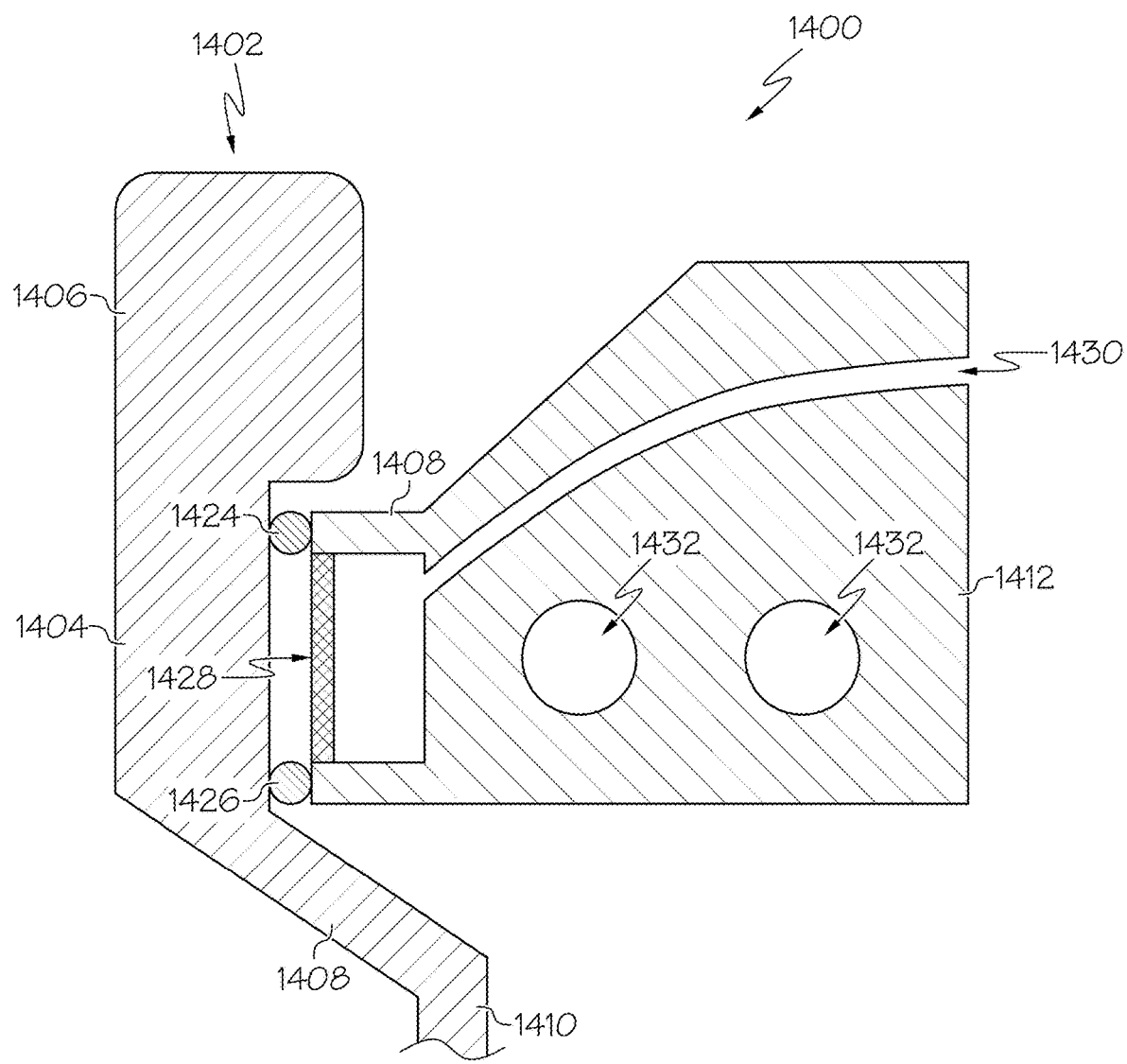
FIG. 13A schematically depicts a cooling apparatus for performing localized thermal strengthening treatments on a glass container, according to one or more embodiments described herein.
Figure 13B:
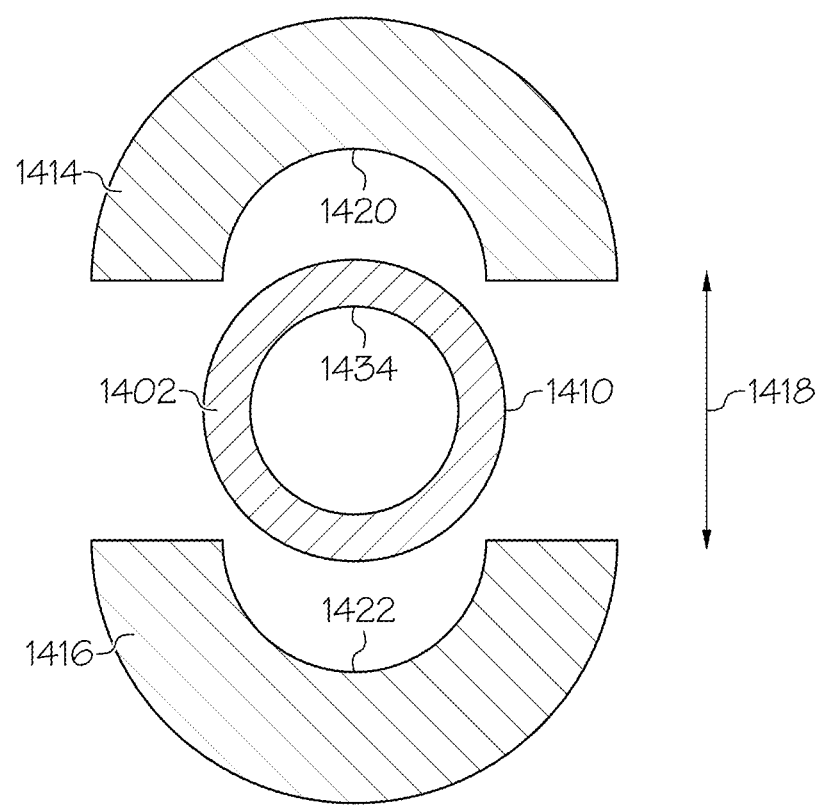
FIG. 13B schematically depicts a cooling apparatus for performing localized thermal strengthening treatments on a glass container, according to one or more embodiments described herein.

FIG. 12D depicts the compressive stress at the outer surface 106 within the localized compressive stress region 140 for glass containers 100 having various thicknesses, assuming a heat transfer rate of 0.06 cal/(cm$^2$*sec*K). As depicted, a thicker glass container 100 generally results in a higher compressive stress at the outer surface 106. FIG. 12E depicts the central tension within the localized compressive stress region 140 for glass containers having the thicknesses described in FIG. 12D. As depicted, the greater the thickness, the larger the central tension (e.g., in the adjacent region 1110 described with respect to FIG. 11A).

In order to achieve a desired amount and depth of compressive stress within the glass container 100 within the localized compressive stress region 140, various coolants may be applied to the glass container 100 at the localized compressive stress region 140. In embodiments, helium, air, engine oil, and evaporated steam possess relatively high heat transfer coefficients, rendering them well suited for potential use in the thermal strengthening treatments described herein. In embodiments, the coolant may delivered to the localized compressive stress region 140 at a particular temperature via tooling specifically designed for the region on the glass container 100 in which the localized compressive stress region 140 is placed.

Figure 14:
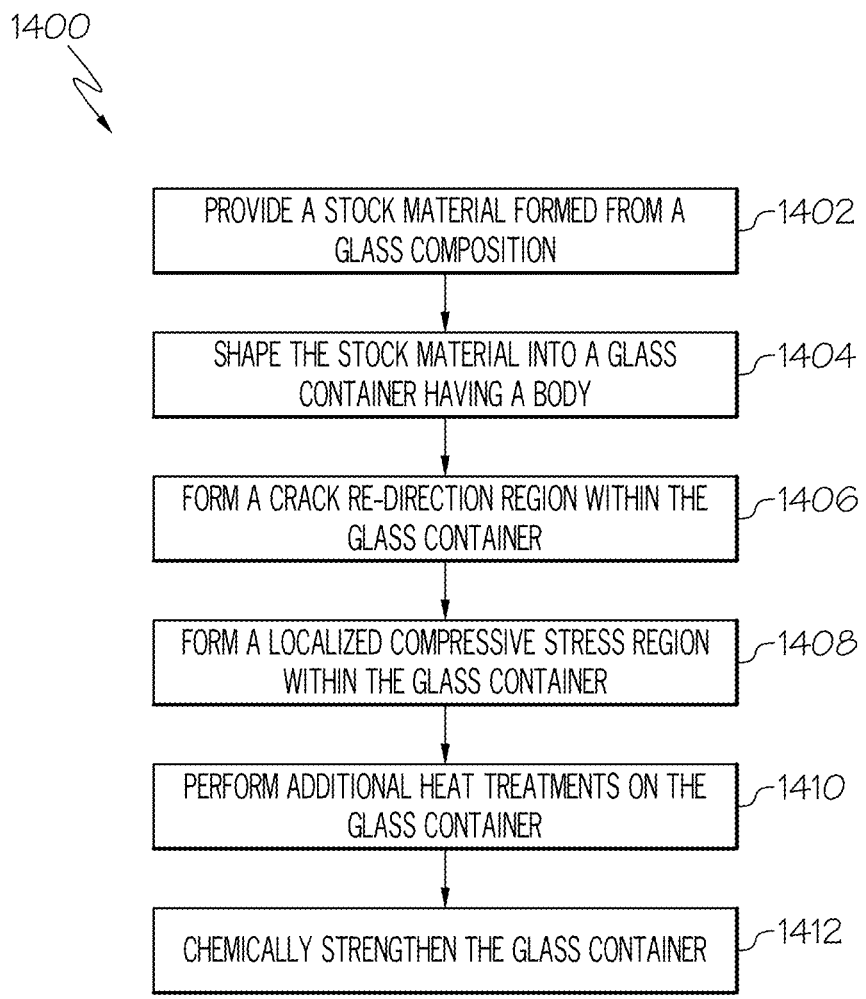
FIG. 14 depicts a method for converting stock material of a glass composition into a glass container including at least one of a crack re-direction region and a localized compressive stress region, according to one or more embodiments described herein.

FIGS. 14A and 14B schematically depict a cooling apparatus 1400 for performing the localized thermal strengthening treatments described herein. In embodiments, the cooling apparatus 1400 may be integrated into a processing station of a converter (e.g., the converter 900 described herein with respect to FIG. 9) in order to thermally strengthen the glass container 100 during the process of converting glass tubing into the glass container 100. As described herein, the converter 900 may include heating stations that heat glass tubing to temperatures suitable for forming (e.g., temperatures greater than or equal to 870° C.). Such temperatures are greater than the starting temperatures (e.g., greater than or equal to 750° C.) to achieve desired levels of compressive stress within alkali aluminosilicate glass containers. As such, positioning the cooling apparatus 1400 within the converter 900 may result in efficiencies, as the glass composition is already heated to the requisite starting temperature, though it should be appreciated that the cooling apparatus 1400 may be separate from the converter 900 and be used after a subsequent heating step of a completely converted glass container 100.

In the depicted embodiment, the cooling apparatus 1400 is designed to apply coolant to specifically cool a neck region 1404 of a glass container 1402. The cooling apparatus 1400 includes a coolant manifold 1408 that is sized so as to contact an outer surface 1410 of the neck region 1404. The coolant manifold 1408 extends from a body 1412. The coolant manifold 1408 may have a size (e.g., in an axial direction of the glass container 1402 and a circumferential direction) that corresponds to a desired size for a localized compressive stress region to be placed on the glass container 1402.

As depicted in FIG. 14B, the body 1412 includes a first portion 1414 and a second portion 1416. In FIG. 14B, the first portion 1414 and the second portion 1416 are separated from one another (e.g., within a processing station on the converter 900) to provide clearance for insertion of the glass container 1402 (or a glass tubing or partially formed glass container) therebetween. The first portion 1414 and the second portion 1416 may each be coupled to an actuator that facilitates translation along an axis 1418 extending perpendicular to an axis of the glass container 1402. For example, once the glass container 1402 is placed in a desired axial position (such that the cooling apparatus 1400 axially overlaps with a region of the glass container 1402 where it is desired to incorporate a localized compressive stress region), the first and second portions 1414 and 1416 may be translated towards one another until inner surfaces 1420 and 1422 of the cooling apparatus 1400 are separated from the outer surface 1410 by a desired minimum separation distance. In the embodiment depicted in FIG. 14B, the cooling apparatus 1400 may surround the glass container 1402 so as to impart a localized compressive stress region that extends around an entirety of the glass container 1402 within the neck region 1404.

In embodiments, as depicted in FIG. 14A, the cooling apparatus includes contact points 1424 and 1426 that control a precision of the minimum separation distance between the cooling apparatus 1400 and the outer surface 1410. In embodiments, the contact points 1424 and 1426 may comprise points of pressurized gas (e.g., of coolant originating from the coolant feed 1430, of other gas). In embodiments, the contact points 1424 and 1426 may comprise wheels or other rotatable members to facilitate positioning of the cooling apparatus 1400 on the glass container 1402. In embodiments, the contact points 1424 and 1426 may include rims extending from the coolant manifold 1408 (e.g., constructed of the same material as the body 1412 or different material from the body 1412) to provide a controlled minimum separation distance. When the first and second portions 1414 and 1416 are translated toward one another, the contact points 1424 and 1426 may contact the outer surface 1410 to create a coolant cavity 1428 disposed between the coolant manifold 1408 and the outer surface 1410. The body 1412 includes a coolant feed 1430 extending therethrough. In embodiments, the coolant feed 1430 fluidly couples the coolant cavity 1428 to a coolant source (not depicted). Coolant from the coolant source (e.g., water vapour, helium, air, oil) may be provided through the coolant feed 1430 into the coolant cavity 1428 such that the coolant may contact the glass container 1402 to increase the heat transfer coefficient achieved via the cooling apparatus 1400.

The body 1412 also includes fluid channels 1432 extending therethrough. The fluid channels 1432 may receive a cooling fluid from a fluid source (not depicted) so as to lower the temperature of the cooling apparatus 1400. By sizing the various components (e.g., the coolant manifold 1408, the body 1412) of the cooling apparatus 1400 in a manner that corresponds to a specific region on the glass container 1402, intimate contact between the glass container 1402 and the cooling apparatus 1400 may be achieved to provide a sufficiently high heat transfer coefficient to induce compressive stress in the glass container 1402. That is, by specifically designing thermal strengthening treatment processes for sub-regions on the container, intimate contact and coolant application to the sub-regions provide relatively high heat transfer rates for effective thermal strengthening at a localized compressive stress region.

While the preceding example described with respect to FIGS. 14A and 14B is tailored to a neck region of the glass container 1402. It should be understood that similar sizing and configuration is possible for various other locations depending on the type of glass containers being strengthened. Several other areas that it may be desirable to incorporate a localized compressive stress region include, but are not limited to a heel region of a vial (e.g., the heel region 114 described herein with respect to FIG. 1), a foot region of a cartridge, a neck region of a syringe, a flange of a syringe, or anywhere else within a glass container. In embodiments, glass containers may include multiple localized compressive stress regions. In such embodiments, the multiple localized compressive stress regions may be formed in a single processing step (e.g., a single cooling apparatus may include multiple axial portions, with each portion being designed to intimately contact a sub-region of the container) or separate processing steps. For example, each processing step may include a cooling apparatus similar to the cooling apparatus 1400 described with respect to FIGS. 14A and 14B designed to provide intimate contact with a separate region of a glass container. In embodiments, the separate processing steps to form each localized compressive stress region may be separated by a heating step to re-heat the glass container to a desired starting temperature for the thermal strengthening treatments.

Alternative methods than cooling apparatus depicted in FIGS. 14A and 14B may be used for the localized thermal strengthening treatments described herein. For example, targeted application of a coolant to a specific region of a glass container may be used to create a localized compressive stress region. Such embodiments may include a coolant applicator that does not contact the glass container, but rather applies coolant in a desired pattern to the glass container to have a desired cooling effect. For example, the coolant may comprise a condensed coolant (e.g., snow) or the like that may be controllably applied to various regions (e.g., on the both inner and outer surfaces of a glass container). Water, steam, air, oil, and various other potential coolants may be used in such embodiments. In embodiments, an amount of coolant that is circulated to contact the glass container (e.g., determined by controlling a coolant supply feed) and/or the amount of evaporation of the coolant upon contacting the glass container (e.g., determined by the type of coolant used) may control the heat transfer rate. In embodiments, the controlled cooling of the glass container for thermal strengthening may be combined with other aspects of the conversion process to provide further processing efficiencies. For example, in embodiments, a forming apparatus (e.g., having a shape to contact the glass container at a forming temperature to shape the glass container) may have an integrated coolant feed such that coolant may be provided to a formed region while the region is being formed to thermally strengthen that region. In such embodiments, oil may be used to establish a contact surface between the forming apparatus and the glass container such that the contacted surface of the glass container is simultaneously formed and cooled.

It should also be understood that the localized compressive stress regions described herein may also be located on an inner surface of the outer container. For example, while a glass container is subjected to thermal strengthening via the cooling apparatus 1400 described with respect to FIGS. 14A and 14B, an inner surface 1434 of the glass container 1402 (see FIG. 14B) may be convectively cooled by air flowing through the processing station into which the cooling apparatus 1400 is incorporated, resulting in some degree of thermal tempering. In embodiments, the inner surface 1434 may be cooled via a different method than the outer surface 1410. For example, in embodiments, a region of the outer surface 1410 is thermally strengthened by the cooling apparatus 1400, while a region of the inner surface 1434 is thermally strengthened via application of a controllable coolant (e.g., snow). In embodiments, the strengthened regions of the outer surface 1410 and the inner surface 1434 may overlap (e.g., oppose one another) to provide a balanced compressive stress profile and increased central tension to facilitate crack branching in the event a surface flaw damages the glass container 1402 beyond a threshold amount. For example, a bottom of a container may be cooled externally and internally to provide such a balanced stress profile to ensure separation in the event of a surface flaw in the bottom.

Referring now to FIG. 15, a flow diagram of a method 1500 of forming a glass container including at least one of a crack re-direction region or a localized compressive stress region is depicted. The method 1500 may be used to form the glass container 100 described herein with respect to FIG. 1. Performance of the method 1500 may result in a glass container locally strengthened via the local thermal strengthening treatments described herein in desired regions of the glass container that are susceptible flaws that may propagate. Additionally, class containers resulting from performance of the method 1500 may re-direct cracks propagating through portions of a container that are difficult to notice by users such that users may notice such cracks and discard cracked containers.

In a step 1502, a stock material formed from a glass composition is provided. The composition of the glass article may be vary depending on the implementation. As described herein glass containers incorporating crack re-direction regions may provide regions of increased central tension resulting from CTE mismatches from ion exchange strengthening. As such, embodiments incorporating a crack re-direction region may be formed from a glass composition capable of chemical strengthening through ion exchange. In embodiments, the glass composition is alkali aluminosilicate glass composition that generally includes a combination of $SiO_2$ and one or more alkali oxides, such as $Na_2O$ and/or $K_2O$. The glass composition may also include $Al_2O_3$ and at least one alkaline earth oxide. In embodiments, borosilicate glass compositions or other aluminosilicate compositions may be used. In embodiments, the stock material formed from the glass composition may comprise a glass tubing formed from the glass composition. The glass tubing may be produced using a Vello Process, such as the process described in U.S. Pat. No. 4,023,953. Other processes, such as the Danner Process for example, may be used to produce the glass tubing.

In a step 1504, the stock material is shaped into a glass container having a body. As should be understood, the processing steps taken to form the glass container may depend on the stock material and the shape of the glass container into which the stock material is formed. For example, in embodiments, the stock material may be converted into a glass container having a plurality of different shapes, such as bottles, vials, syringes, ampoules, cartridges, and other glass articles for pharmaceutical applications. The stock material may also be converted into glass containers for use outside of pharmaceutical applications, such as food packaging for example. In embodiments, the forming step may take place in a converter, such as the converter 900 described herein with respect to FIG. 9. As described herein, the converter 900 includes a plurality processing stations 904 including, for example, one or more heating, forming, polishing, cooling, separating, piercing, re-cladding, trimming, measuring, feeding, or discharge stations or other processing stations for producing the glass articles from the glass tubing. In embodiments, the stock material is heated to a forming temperature above a softening point of the glass composition via a heating station of the plurality of processing stations 904. After heating, the stock material may be subjected to a plurality of different forming stations to shape the stock material into a desired glass container. For example, where the glass container is the vial depicted in FIG. 1, various forming stations may be used to shape the flange 126, neck region 124, shoulder region 116, barrel 118, and heel region 114 of the glass container 100. After forming and subsequent additional steps (e.g., measuring, polishing, coating), a formed glass container may be separated from the stock material via a separation (e.g., scoring) station.

In a step 1506, a crack re-direction is formed within the glass container. As described herein, the crack re-direction region may be formed at various points within the process of converting the stock material into the glass container, or, alternatively, after the conversion process is completed. For example, in embodiments, the converter 900 includes a forming station that forms at least one crack re-direction region within the glass container while the stock material is heated above a forming temperature of the glass composition. For example, in embodiments, the converter 900 may include the processing station 1000 described herein with respect to FIG. 10. At least one of the first laser beam source 1006 and the second laser beam source 1010 may scan a laser beam (e.g., a pulsed $CO_2$ laser beam) across a surface of the stock material to form a plurality of depressions on a surface of the stock material such that that the glass container resulting from the converting process includes a plurality of depressions where the glass container has a minimum thickness $T_{min}$ that is less than a wall thickness $T_W$ of the glass container outside of the crack re-direction region.

In embodiments, the crack re-direction regions may be formed simultaneously or after formation of the localized compressive stress regions. For example, as described herein, a crack re-direction region may be formed by forming a reduced-density region within the glass container by exposing the crack re-direction to different thermal treatments than the remainder of the glass container. As such, in embodiments, a crack re-direction region may be formed through a thermal strengthening step similar to those described herein with respect to FIGS. 11A-14B. For example, a cooling apparatus may contact the stock material in a pattern so as to create a tensile stress differential extending substantially perpendicular to any desired propagation direction (e.g., in the axial direction, in the circumferential direction, or any combination thereof). In another example, a reduced-density region may be formed by shielding the glass container during an anneal step after formation of the glass container (e.g., during the step 1510).

In embodiments, the crack re-direction regions may be formed during chemical strengthening of the glass container (e.g., during the step 1512 described herein). For example, in addition to creating a feature or plurality of features on the surface of the stock material during the conversion process, an ion exchange process may be blocked at various portions within the crack re-direction region to create complex center tension profiles for re-directing cracks. In embodiments, any combination of the features and the methods for forming the same may be used to form any number of crack re-direction regions on the glass container.

In a step 1508, a localized compressive stress region is formed within the glass container. In embodiments, the localized compressive stress region is formed during the process of converting the stock material into the glass container. For example, in embodiments, subsequent to being subjected to a heating station of the converter 900 and heated to a starting temperature, the stock material may be inserted into a thermal strengthening station including the cooling apparatus 1400 described herein with respect to FIGS. 14A and 14B. The cooling apparatus 1400 may be specifically designed to have a surface that corresponds with an outer surface of the stock material so as to provide close contact between the outer surface at a desired location for the localized compressive stress region to enhance a heat transfer rate. Additionally, the cooling apparatus 1400, via the coolant feed 1430, may provide coolant to a coolant cavity 1428 at the surface of the stock material to controllably cool the stock material at a rapid rate so as to create a localized compressive stress region having a depth of compression that is greater than any areas of the stock material that are adjacent to the localized compressive stress region. Alternative methods for cooling the stock material may be used. For example, different coolants (e.g., oil, snow, etc.) may be applied to a portion of the stock material to form a localized compressive stress region in a desired position on the glass container. In embodiments, the localized compressive stress region may be formed after formation of the glass container, where the as-formed glass container is subsequently heated to a desired starting temperature and rapidly cooled via any of the methods described herein.

In embodiments, the crack re-direction region and the localized compressive stress region may overlap with one another. For example, a crack re-direction region comprising a plurality of depressions may be subsequently subjected to the localized thermal strengthening treatments described herein. Such an implementation may increase the central tension within the crack re-direction region over embodiments where the localized compressive stress region does not overlap with the crack re-direction region, thus enhancing the crack re-direction capabilities of the crack re-direction region. Additionally, the glass container may include any number of crack re-direction regions and localized compressive stress regions on an inner surface, an outer surface, or both an inner surface and an outer surface.

In a step 1510, additional heat treatments are formed on the glass container. For example, after formation of the glass container, the class container may be subject to an anneal step. Such an anneal step may remove residual stresses in the glass container resulting from thermal tempering induced during the converting process. In embodiments incorporating localized compressive stress regions in areas of the glass container that include such residual stresses, such an anneal step may not be necessary for the glass container, as the areas of the glass container most subjected to damage may have improved protection from damage. Additionally, as described herein with respect to FIG. 12C, the thermal strengthening treatments described herein may induce a temporary tensile stress within the localized compressive stress region during its formation. Such a temporary tensile stress may induce failure in defective glass containers. That is, only relatively strong glass containers without flaws may survive the thermal strengthening treatments, reducing the need for the annealing step.

In embodiments, the glass container may be subjected to flame washing after the conversion process. Such a flame washing step may remove or reduce surface flaws on the glass container resulting from the conversion process. In embodiments, such a flame washing step may be performed prior to formation of the localized compressive stress regions in the step 1508 to remove flaws that may propagate as a result of the transient tensile stress induced via the thermal strengthening treatments used to form the localized compressive stress region.

In a step 1512, the glass container may be subjected to chemical strengthening treatments. In embodiments, the glass container may be subjected to ion exchange strengthening while be immersed in a molten salt bath. Such ion exchange strengthening may form a compressively stressed layer (e.g., the compressively stressed layer 202 described herein with respect to FIG. 2) throughout the glass container. The crack re-direction regions described herein, after the chemical strengthening step, may possess a tensile stress distribution balancing out the compressive stress induced via the chemical strengthening step that possesses a stress differential in a direction perpendicular to a desired propagation direction. In embodiments incorporating a localized compressive stress region, the chemical strengthening step may be eliminated as the glass container may possess sufficient durability for use as a result of the localized compressive stress regions.

In view of the foregoing description, it should be understood that incorporating at least one of a crack re-direction region and a localized compressive stress region into glass containers beneficially improves durability of the glass containers and/or improves the visibility of cracks propagating through the glass containers. The crack re-direction regions may direct cracks originating from common positions of surface flaws on the containers to regions of the glass containers not including viewing obstructions (e.g., adhesive labels or the like) such that users of the glass containers may notice the cracks and discard defective glass containers prior to products contained therein becoming contaminated. The localized compressive stress regions beneficially increase a damage threshold for surface flaws to propagate through the glass container at regions that routinely contact external elements (e.g., filling apparatuses, other glass containers, carriers) and render the glass containers more durable. As such, the glass containers described herein have improved durability over existing glass containers, and, in the event that a crack propagates through the glass container, such a crack is re-directed to a portion of the container where it may be noticed more quickly than cracks propagating through existing glass containers.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of making a glass container having a first surface and a second surface separated by a thickness, the method comprising:
    forming a first region under a compressive stress on the first surface of the glass container, wherein the first region extends from the first surface to a depth of compression in the glass container;
    forming a second region under a central tension, the second region extending from the depth of compression into the thickness, wherein the central tension is sufficient for self-propagation of a crack at the first surface from an origination point of the crack; and
    forming a crack re-direction region in the first surface, wherein:
        the crack re-direction region extends in a predetermined propagation direction for the crack, and
        the crack re-direction region comprises a higher central tension than a remainder of the glass article in a direction substantially perpendicular to the predetermined propagation direction such that, upon the crack propagating and reaching the crack re-direction region, the crack is redirected along the predetermined propagation direction,
    wherein the glass container comprises a body having an interior surface and an exterior surface, the interior surface defining an interior volume having an axis,
    wherein the predetermined propagation direction is substantially perpendicular to the axis, and
    wherein the thickness of the glass container varies within the crack re-direction region such that the crack re-direction region comprises a thin region extending substantially parallel to the axis where the thickness is less than an average thickness of the glass container within the crack re-direction region.

2. The method of claim 1, wherein the crack-redirection direction region extends around at least a portion of an outer circumference of the glass container.

3. The method of claim 2, wherein the thickness of the glass article in the crack re-direction region varies sinusoidally parallel to the axis.

4. The method of claim 2, wherein the crack re-direction region extends around an entirety of the outer circumference of the glass container.

5. The method of claim 1, wherein the first surface is the exterior surface of the glass container.

6. The method of claim 1, wherein the first surface is the interior of the glass container.

7. The method of claim 1, wherein forming the first and second regions comprises:
    forming the glass container from a glass composition; and
    forming the first region and the second region by subjecting the first surface of the glass container to chemical tempering.

8. The method of claim 7, wherein the glass composition comprises an aluminosilicate glass composition.

9. The method of claim 7, wherein forming the glass article from the glass composition comprises:
    forming a glass tube comprising the glass composition; and
    converting the glass tube into the glass container, wherein forming the crack re-direction region occurs during the conversion of the glass tube into the glass container.

10. The method of claim 9, wherein forming the crack re-direction region comprises scanning a pulsed laser beam in a predetermined pattern while the glass tube is heated to a softening temperature of the glass composition during the converting of the glass tube into the glass container.

11. A method of forming a glass container having a crack re-direction region, the method comprising:
    providing a stock material formed from a glass composition, the stock material comprising glass tubing;
    converting the glass tubing into a glass article having a body extending between an interior surface and an exterior surface defining an interior volume;
    forming a compressively stressed layer in the glass article, the compressively stressed layer extending from at least one of the interior surface and the exterior surface to a depth of compression in a thickness of the body; and
    forming the crack re-direction region within the glass article, wherein the crack re-direction region comprises a sub-region having a higher central tension than a remainder of the glass article, wherein the sub-region extends in a direction substantially perpendicular to a predetermined propagation direction and the thickness of the sub-region is less than an average thickness of the body,
    wherein forming the crack re-direction region comprises forming the sub-region of the crack re-direction region during the converting of the glass tubing into the glass article, and
    wherein forming the sub-region comprises contacting the glass tubing during the conversion of the glass tubing into the glass article with a shaping element.

12. The method of claim 11, wherein forming the sub-region comprises scanning a pulsed laser beam in a predetermined pattern on the glass article.

13. A glass container comprising:
a glass body comprising a first region under a compressive stress extending from a surface of the glass body to a depth of compression and a second region extending from the depth of compression into a thickness of the glass body, the second region under a tensile stress sufficient for self-propagation of a crack from an origination point of the crack in a propagation direction; and
a crack re-direction region on the surface of the glass body, the crack re-direction region extending in a predetermined propagation direction for the crack, wherein the crack re-direction region comprises a greater tensile stress than the tensile stress in the second region in a sub-region of the crack re-direction region, the sub-region extending substantially perpendicular to the predetermined propagation direction such that, upon the crack propagating into the crack re-direction region, the crack is redirected along the predetermined propagation direction,
wherein the predetermined propagation direction is a circumferential direction substantially perpendicular to an axis of the glass container, and
wherein the thickness varies within the crack re-direction region such that the sub-region of the crack re-direction region comprises a thin region extending substantially parallel to the axis where the thickness is less than an average thickness of the glass article.

14. The glass container of claim 13, wherein the glass container comprises one of a bottle, vial, ampoule, syringe, or cartridge.

15. A method of forming a glass container, the method comprising:
providing a stock material formed from a glass composition;
shaping the stock material into a glass article having a body extending between an interior surface and an exterior surface, the body defining an interior volume;
forming a crack re-direction region within the glass article, wherein the crack re-direction region comprises a sub-region having a higher central tension than a remainder of the glass article, wherein the sub-region extends in a direction substantially perpendicular to a predetermined propagation direction; and
forming a localized compressive stress region in the glass article, the localized compressive stress region having a localized compressive stress extending from the interior surface or the exterior surface to a localized depth of compression within the body, wherein the localized depth of compression is greater than or equal to 2% of a thickness of the body and less than or equal 25% of the thickness of the body, wherein forming the localized compressive stress region comprises locally applying a coolant to a portion of the glass article when the glass article is heated to a starting temperature above a softening temperature of the glass composition.

16. The method of claim 15, further comprising forming a compressively stressed layer in the glass article, the compressively stressed layer extending from at least one of the interior surface and the exterior surface to a depth of compression into a thickness of the body.

17. The method of claim 16, wherein forming the compressively stressed layer comprises subjecting the glass article to ion-exchange strengthening after forming the localized compressive stress region to form a first region on the exterior surface under a compressive stress, the first region extending from the exterior surface to the depth of compression, wherein the depth of compression is less than the localized depth of compression.

18. The method of claim 17, wherein the localized compressive stress region overlaps with the first region on the external surface.

19. The method of claim 18, wherein the crack re-direction region overlaps with the localized compressive stress region on the external surface.

20. The method of claim 15, further comprising flame washing an entirety of the exterior surface prior to forming the localized compressive stress region to eliminate conversion flaws induced by the shaping of the stock material into the glass article.

21. The method of claim 15, wherein locally applying the coolant to the portion of the glass article comprises:
positioning a collar proximate to the portion of the glass article when the glass article is heated to the starting temperature, the collar including at least one feed for the coolant, wherein the collar is shaped in a manner that corresponds to the portion of the glass article; and
providing the coolant to the portion of the glass article to form the localized compressive stress region.

22. The method of claim 21, wherein the collar comprises contact points that contact the portion of the glass article to control a gap between a fluid manifold of the collar and the portion of the glass article.

23. The method of claim 22, wherein the glass container comprises a vial having a base, a barrel connected to the base via a heel, a shoulder extending from the barrel, and a neck extending from the shoulder, wherein the portion of the glass article to which the coolant is applied comprises at least one of the neck and the heel.

24. The method of claim 15, wherein forming the crack re-direction region comprises forming the sub-region of the crack re-direction region during the shaping of the stock material into the glass article, wherein a thickness of the sub-region is less than an average thickness of the body.

25. The method of claim 24, wherein forming the sub-region comprises scanning a pulsed laser beam in a predetermined pattern on the glass article.

26. The method of claim 24, wherein forming the sub-region comprises contacting the stock material during the shaping of the stock material into the glass article with a shaping element having a shape corresponding to a predetermined shape of the sub-region.

27. The method of claim 15, wherein a thickness of a portion of the crack re-direction region is greater than an average thickness of the body.

* * * * *